May 7, 1968   N. LAING   3,381,922
CAPTIVE HELICOPTER
Filed Oct. 23, 1965   23 Sheets-Sheet 2
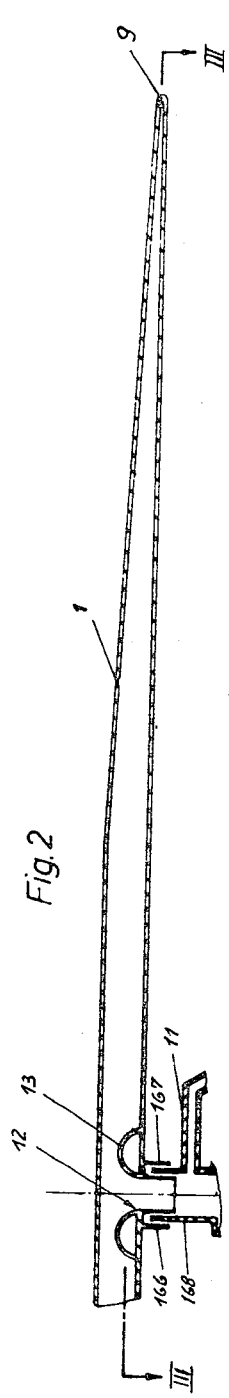
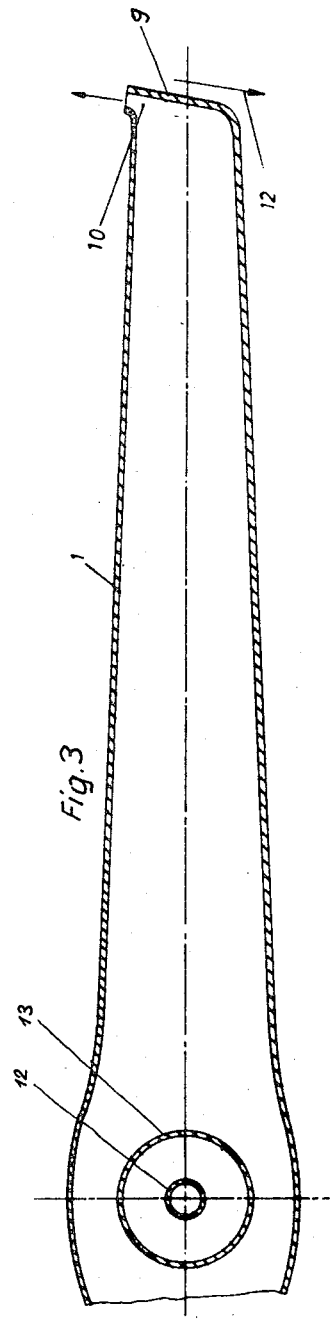
INVENTOR
Nicolaus Laing
BY
ATTORNEY May 7, 1968 N. LAING 3,381,922
CAPTIVE HELICOPTER
Filed Oct. 23, 1965 23 Sheets-Sheet 3

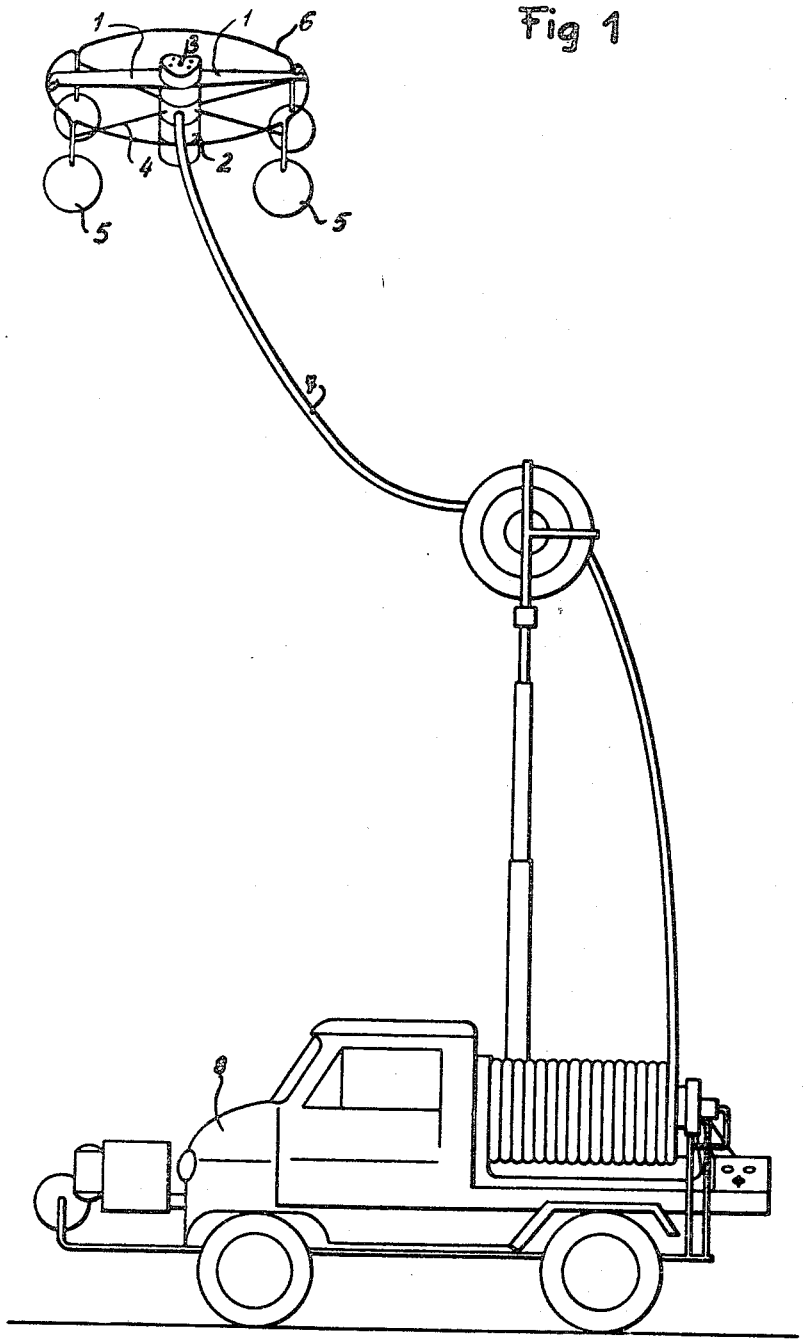

INVENTOR
Nikolaus Laing
BY Michael S. Striker
ATTORNEY

May 7, 1968  N. LAING  3,381,922
CAPTIVE HELICOPTER
Filed Oct. 23, 1965  23 Sheets-Sheet 4
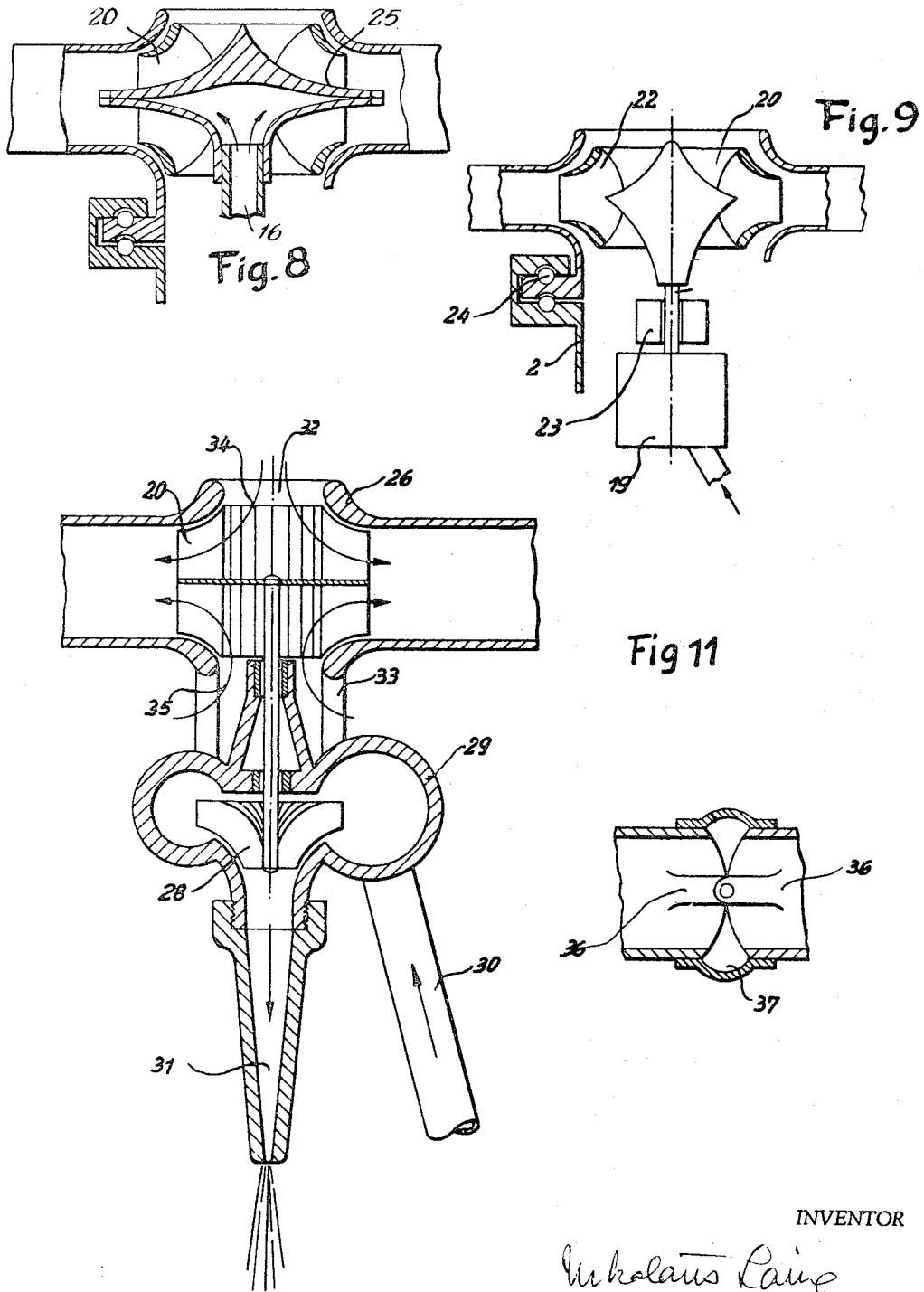
INVENTOR
Nikolaus Laing
BY
Rindall E. Stricker
ATTORNEY May 7, 1968 N. LAING 3,381,922
CAPTIVE HELICOPTER
Filed Oct. 23, 1965 23 Sheets-Sheet 5

May 7, 1968

N. LAING 3,381,922

CAPTIVE HELICOPTER

Filed Oct. 23, 1965

INVENTOR
Nikolaus Laing
BY Michael S. Striker
ATTORNEY

May 7, 1968  N. LAING  3,381,922
CAPTIVE HELICOPTER
Filed Oct. 23, 1965  23 Sheets-Sheet 7

INVENTOR
BY
ATTORNEY

May 7, 1968  N. LAING  3,381,922
CAPTIVE HELICOPTER
Filed Oct. 23, 1965  23 Sheets-Sheet 8
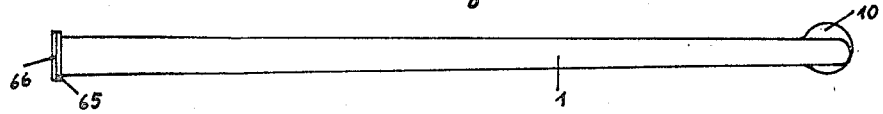
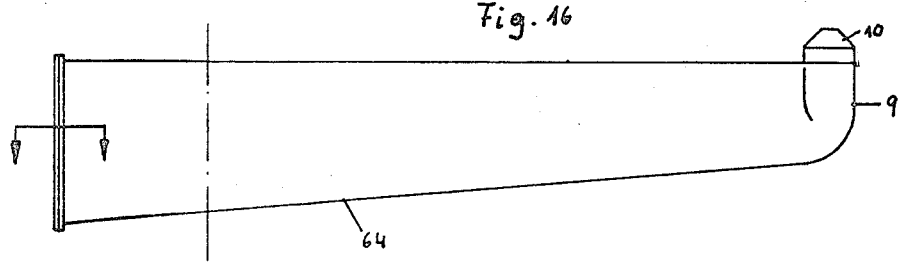
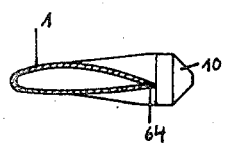
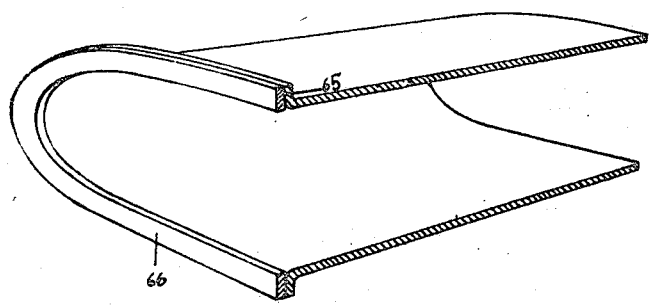
INVENTOR
Nikolaus Laing
BY Michael S. Striker
ATTORNEY May 7, 1968  N. LAING  3,381,922
CAPTIVE HELICOPTER
Filed Oct. 23, 1965  23 Sheets-Sheet 9
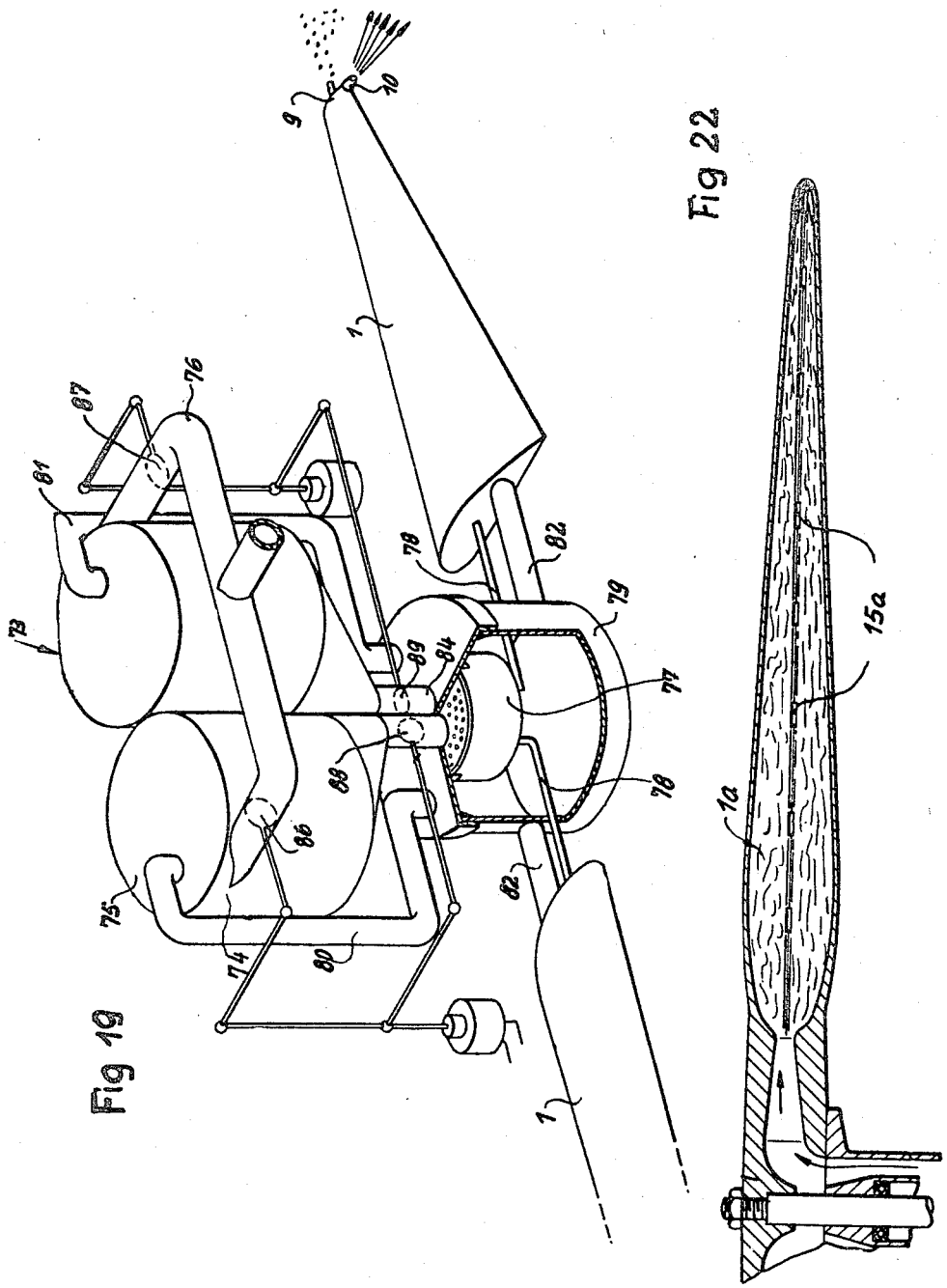
INVENTOR
Nicolaus Laing
BY Michael S. Striker
ATTORNEY May 7, 1968  N. LAING  3,381,922
CAPTIVE HELICOPTER
Filed Oct. 23, 1965  23 Sheets-Sheet 11
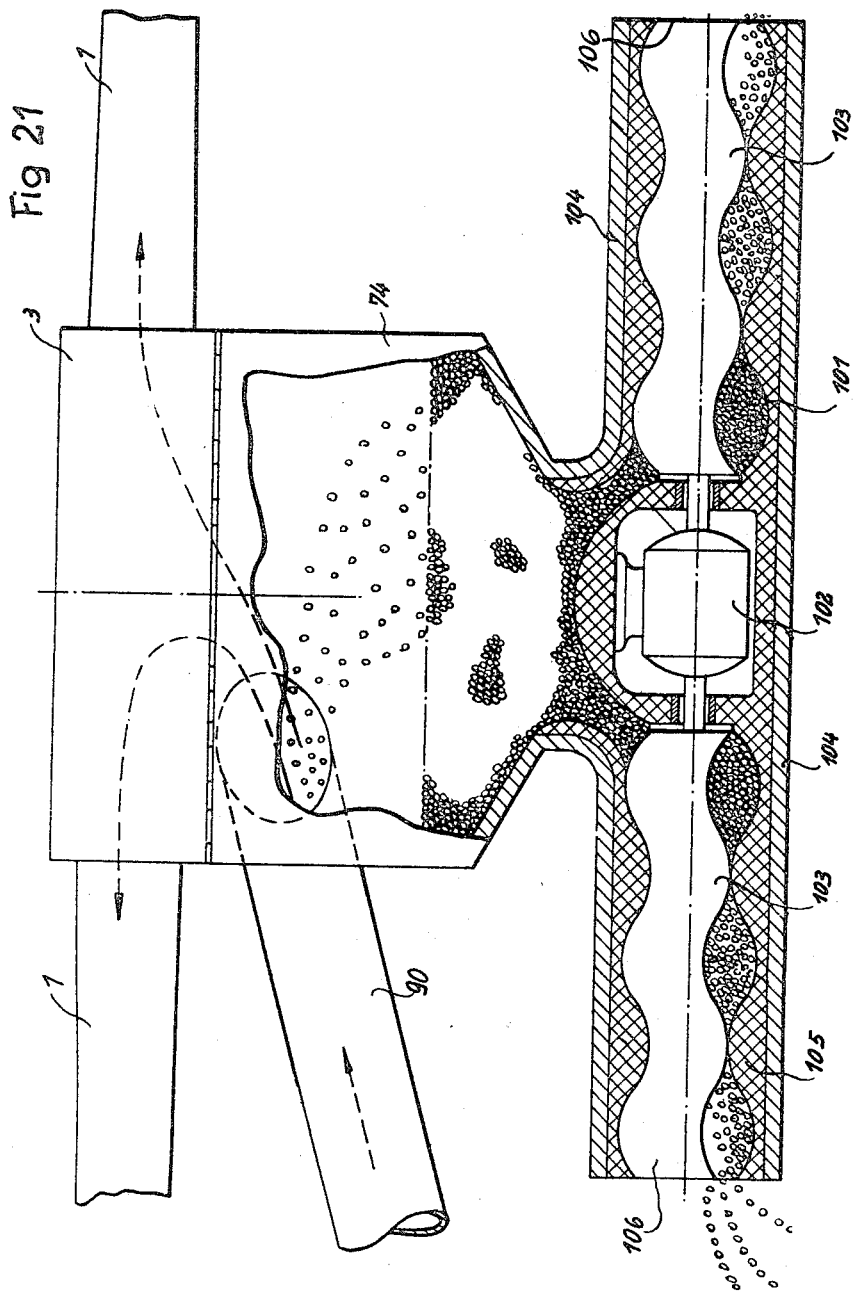
INVENTOR
Nikolaus Laing
BY Michael S. Striker
ATTORNEY May 7, 1968  N. LAING  3,381,922
CAPTIVE HELICOPTER Filed Oct. 23, 1965                 23 Sheets-Sheet 13

INVENTOR
Nikolaus Laing
BY Michael S. Striker
ATTORNEY

May 7, 1968        N. LAING        3,381,922
CAPTIVE HELICOPTER
Filed Oct. 23, 1965        23 Sheets-Sheet 14
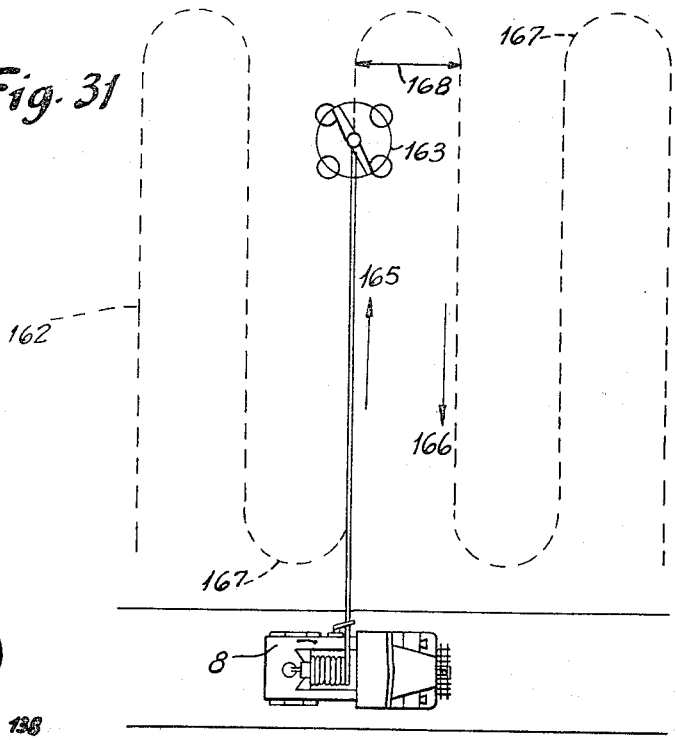
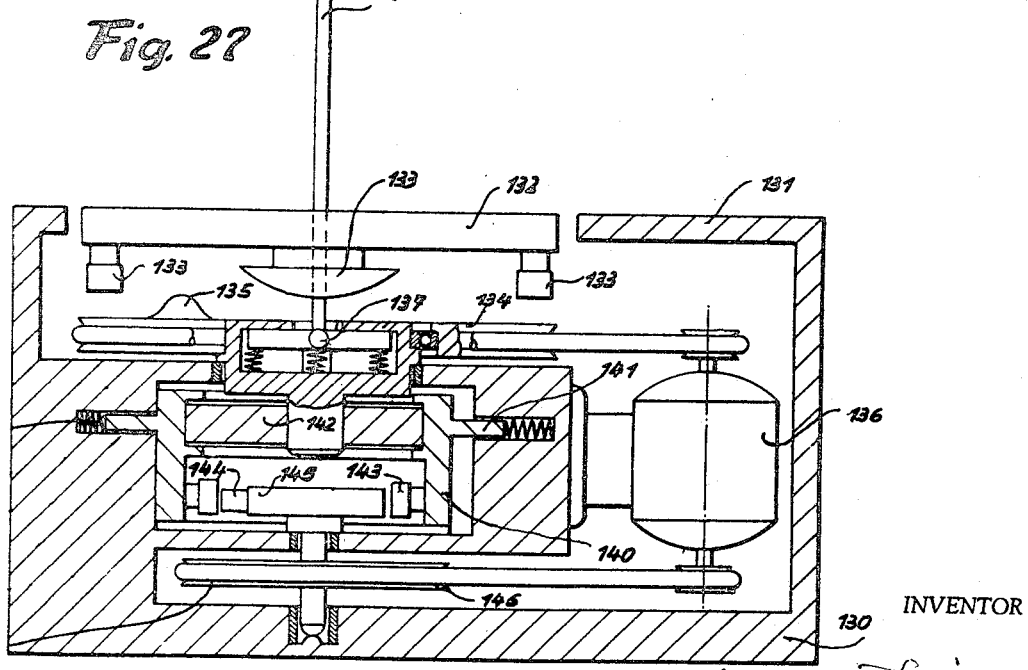

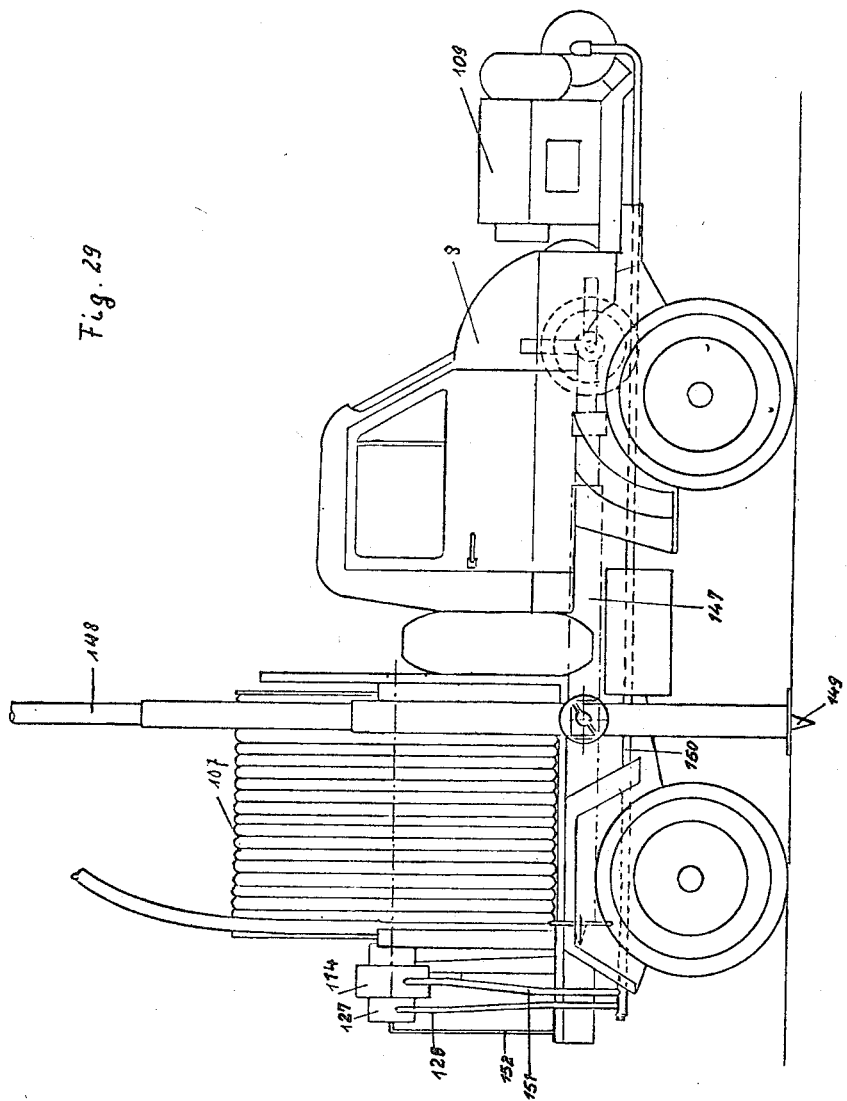

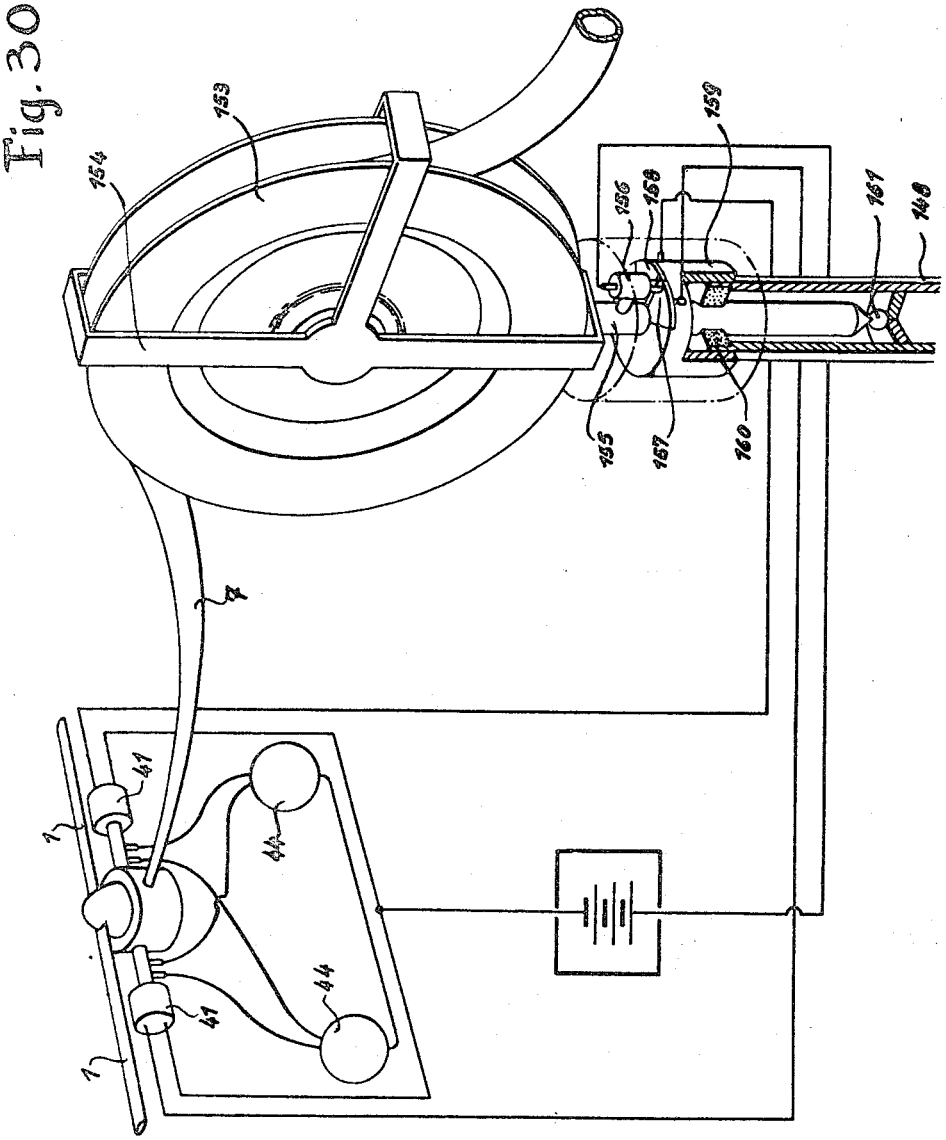

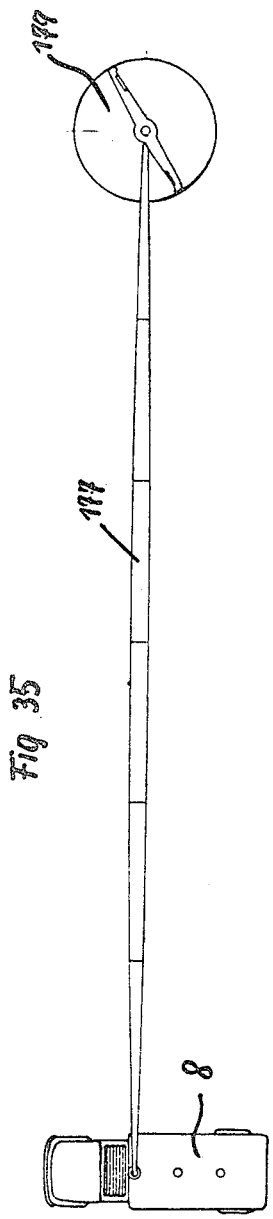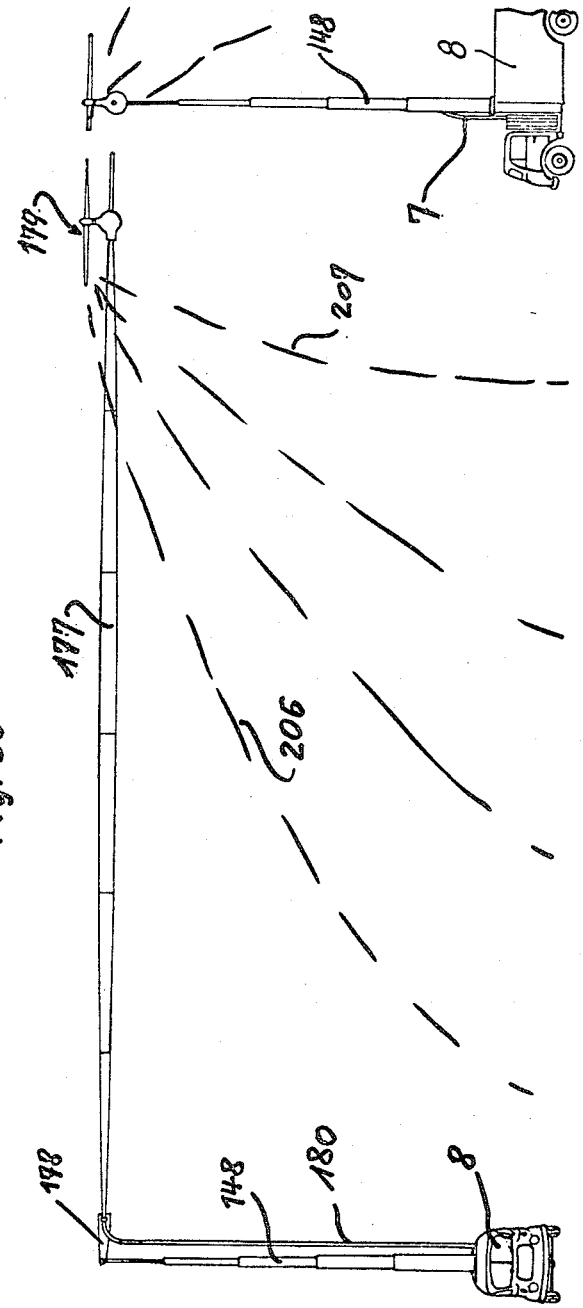

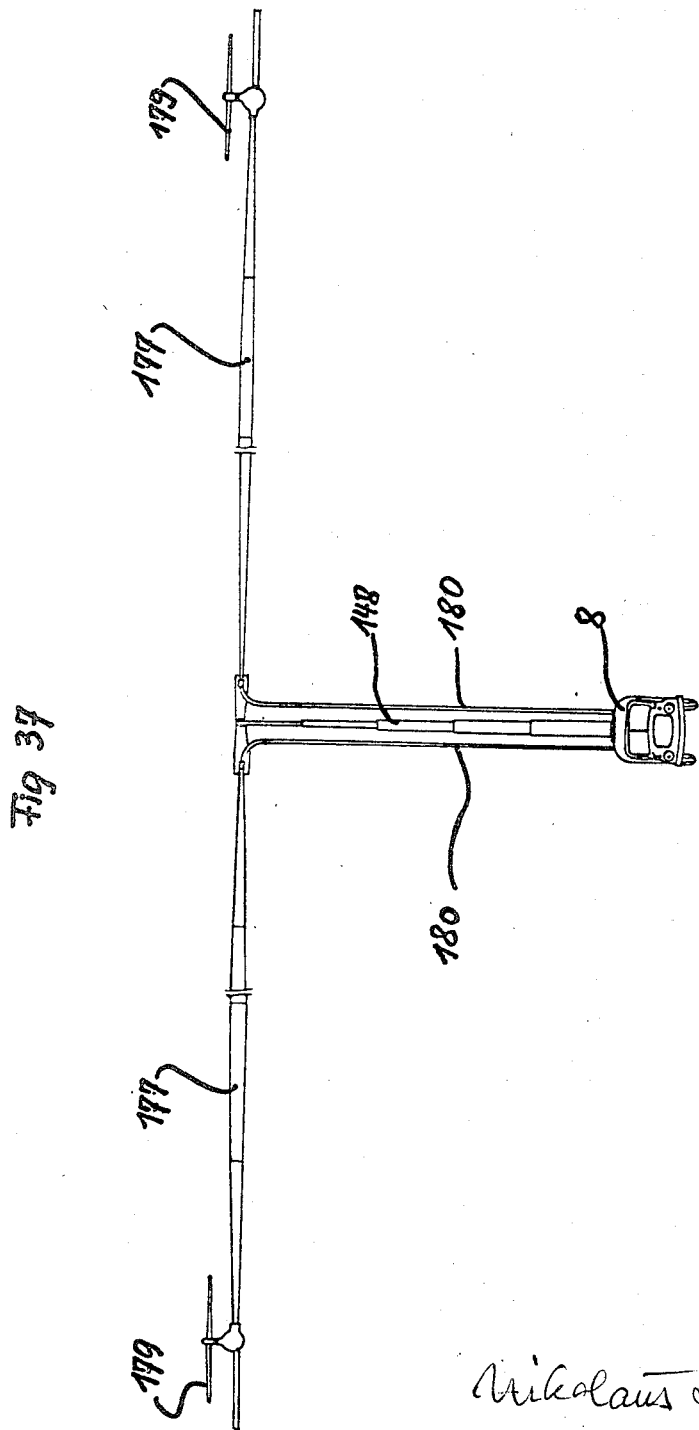

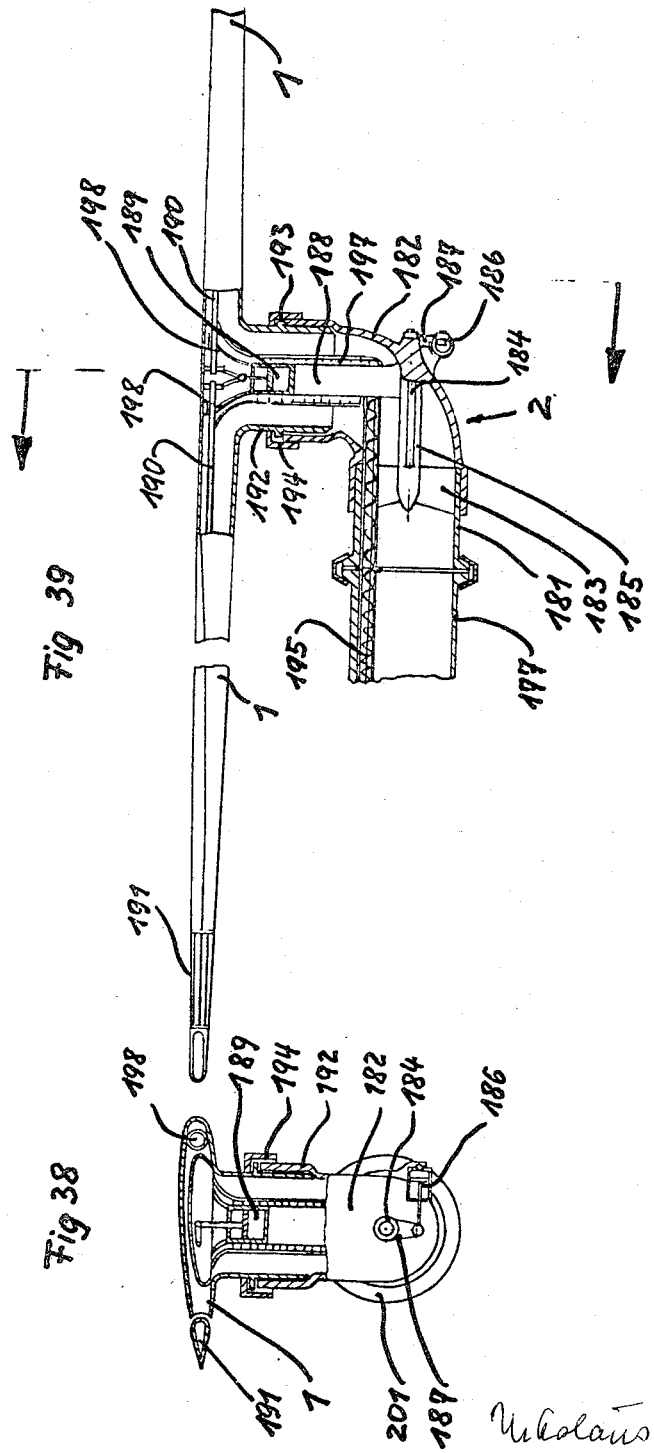

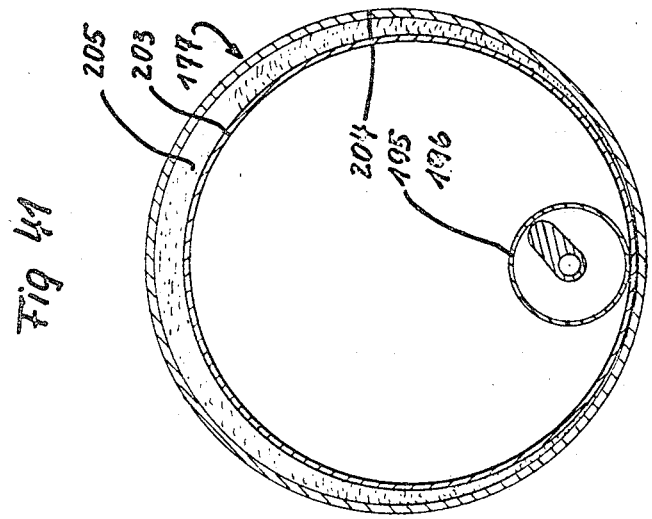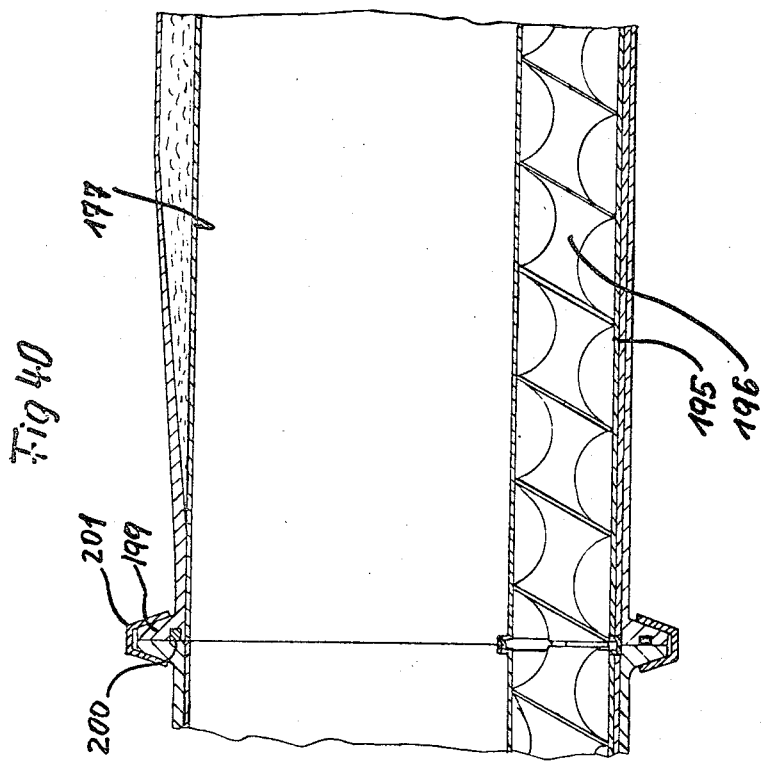

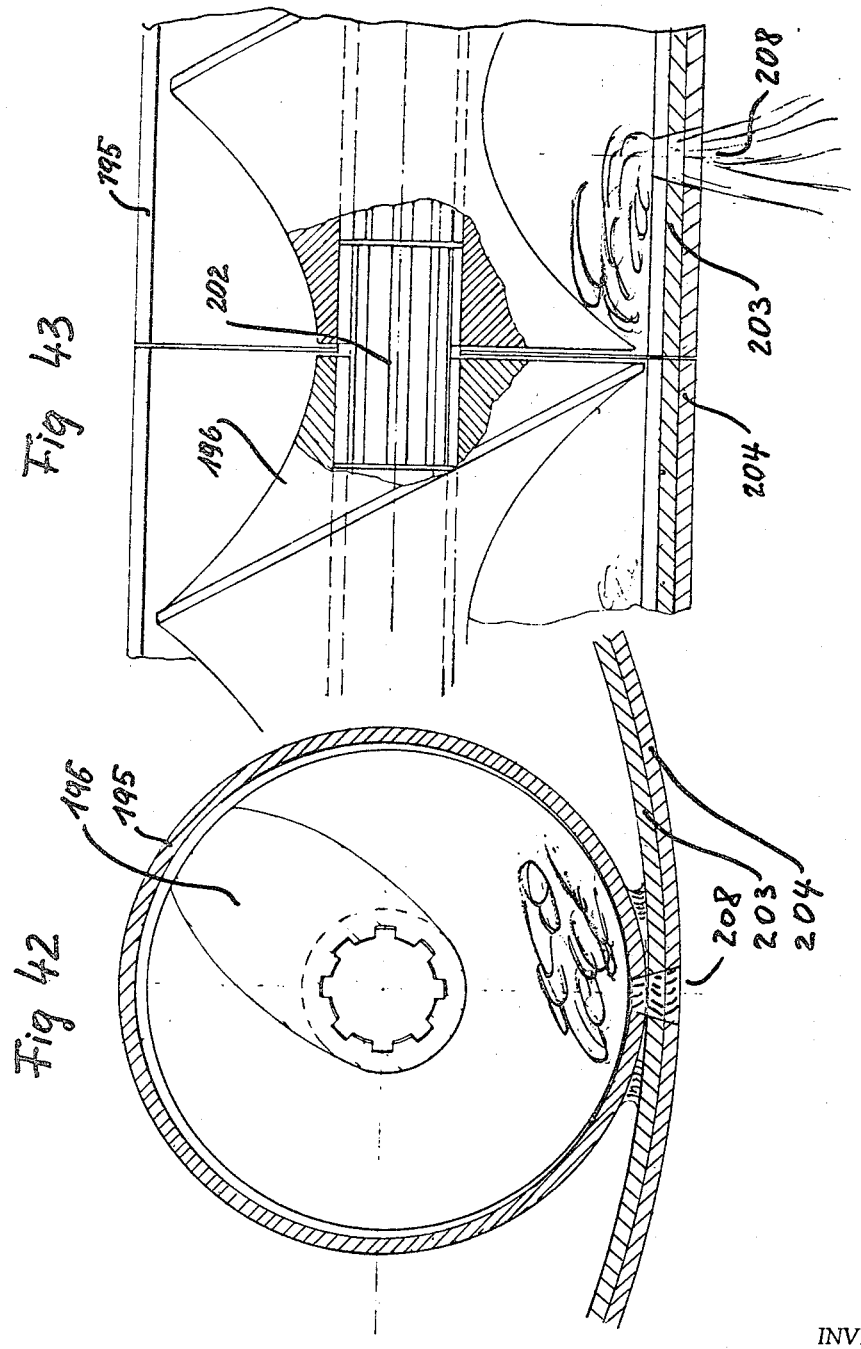

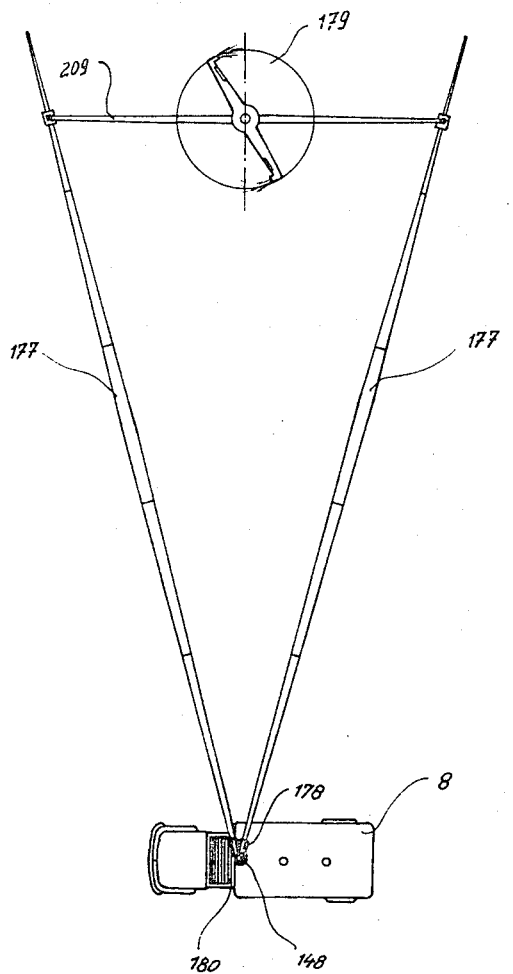

United States Patent Office 3,381,922
Patented May 7, 1968

3,381,922
CAPTIVE HELICOPTER
Nikolaus Laing, 35–37 Hofener Weg.,
7141 Aldingen, Germany
Continuation-in-part of application Ser. No. 166,530,
Jan. 16, 1962. This application Oct. 23, 1965, Ser.
No. 503,189
Claims priority, application Germany, Jan. 18, 1961,
L 37,972
47 Claims. (Cl. 244—136)

ABSTRACT OF THE DISCLOSURE

An apparatus for the distribution of material in particulated, liquid or gaseous form from points above the ground in which a helicopter is connected by conduit means to a driven vehicle which carries energy producing means and material supplying means to supply the helicopter through the conduit means with energy for driving the helicopter and with material to be distributed from the helicopter.

---

The present application is a continuation-in-part application of the application Ser. No. 166,530 filed Jan. 16, 1962, now abandoned.

The present invention is concerned with a heavier- than-air craft of the helicopter type for the discharge of solid, liquid or gaseous materials having an airfoil portion and a support portion.

The performance of agricultural-engineering machinery for the conditioning of soil, for example levelling, ploughing, or harrowing as well for the gathering of crops, e.g. harvesting or threshing, has been greatly improved in the course of time. However, the performance of devices for the discharge of material, e.g. showing, fertilizing, spreading of pest and weed control substances, irrigation, soot distribution and fogging has only been raised marginally. For very large areas, aircraft have been utilized, for example in pest control. for this purpose, spreading devices have been mounted on fixed-wing or rotating wing aicraft by means of which a liquid carried in a tank has been spread in flight over the ground to be treated. In view of the fact that fixed-wing aircraft, owing to their excessively large minimum speeds, are unsuitable for many purposes, helicopters, which basically serve for the transport of persons or cargo, have been used. Such helicopters are expensive in first cost and in operation and require a fully trained pilot.

In order to lessen the cost of the flying machine and to save the need for the pilot, captive helicopters have been constructed before, for communication purposes. These captive helicopters have been attached to the ground station with ropes and were able to rise vertically. For experimental purposes and for flight tests, helicopters have also been provided with electric motors energized from the ground.

It is the object of the present invention to provide a simple and inexpensive device to perform in the most economical manner the wide-area distribution of materials, e.g. in agriculture and forestry.

According to the instant invention, a rotating-wing aircraft, for example a helicopter, is used to distribute pest control substances, soil fertilizers, seeds, foliage fertilizers, water for soil and foliage irrigation, soot, fog and other substances over large areas of ground.

It is an object of the invention to convey, through one or more pipelines between the helicopter and the ground station the substances to be discharged, the energy carrier for the rotary airfoils of the helicopter and the signals which operate the flying controls and which may be, for example, of an electrical, pneumatic or hydraulic nature. In this case, a flying machine is created which is particularly simple and light because, absent crew, fuel carriage and complicated control mechanisms, it is capable of flight and can be controlled from the ground by a single operator with little training.

The drive of the helicopter rotor blades is accomplished via reaction forces and for this purpose the nose is connected to a compressed-air generator on the ground. In a preferred embodiment both the energy carrier and the substances to be discharged can be conveyed together through a single pipeline from the ground installation to the helicopter. In this manner, not only is the need for a pipeline obviated but the energy carrier accomplishes simultaneously the transport of the substances in the hose pipeline.

Preferably the helicopter is constructed of readily assembled components so that it can be easily transported to the place of use. The assembly must be rapid and must be performed by operating personnnel without much skill.

When the energy carrier flows through the hose pipeline together with the materials to be discharged, the control mechanisms may be distributed in their functioning, particularly by granular materials. Therefore a separator, upstream of the control device, may in accordance with this invention be installed in the nonrotating body portion of the aircraft. This separator filters out of the energy carrier the materials to be discharged which are conveyed from the ground to the helicoper together with the energy carrier and feeds these materials separately to the rotor for spreading.

In the design of the separator it is important above all to ensure that the associated power loss, for example the pressure loss in compressed-air drives, is kept as small as possible.

Another object of the invention is the ground station for the purpose of supplying the helicopter from the ground with the material to be discharged, with the energy carrier for the drive and with control impulses.

In order to ensure that always the same quantity of the materials to be discharged enters the pipeline, a metering device can be installed on the ground.

It is another object of the invention to connect a tube or a hose to a telescopic tube mounted at a vehicle, the tube being connected to a special helicopter.

An intermediate conveyor tube having a spiral conveyor and being assembled from components and serving to convey material can be inserted in the comparatively stiff conveying tube interconnecting the telescopic tube and the helicopter, the material to be distributed being discharged through holes over the length of the tube or from the helicopter blades.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

FIGURE 1 is a side elevation of an apparatus having a hose line leading from a helicopter to a ground station with a motor vehicle;

FIGURE 2 is a longitudinal section of a helicopter rotor blade having nozzles at the blade tips;

FIGURE 3 is a section along a line III—III through the illustration of FIGURE 2;

FIGURE 8 is a schematic section of a helicopter rotor blade having pressure-generating means and a compressed-air motor;

FIGURE 9 is a schematic section of a helicopter rotor hub having pressure-generating means and a Nernst-type turbine;

FIGURE 11 is a schematic section of a helicopter rotor hub having pressure-generating means and a water turbine;

FIGURE 15 is a side elevation of a helicopter rotor blade drawn from a piece of sheet-metal;

FIGURE 16 is a top view of a blade according to FIGURE 15;

FIGURE 17 is a section through the blade as illustrated in FIGURES 15 and 16 along a line XVII—XVII in FIGURE 16;

FIGURE 18 is a portion of a blade according to FIGURES 15 to 17 in enlarged and perspective representation;

FIGURE 19 is a perspective view of a separator arranged above the helicopter rotor hub;

FIGURE 21 is a section through a third separator having distributing means;

FIGURE 22 is a section through a helicopter rotor blade in which fuel is burned and from which the exhaust gases escape through nozzles together with excess air;

FIGURE 27 is a section of a ground control device;

FIGURE 29 is an elevation of the ground equipment mounted on a utility vehicle for supplying the helicopter;

FIGURE 30 is a schematic view of the automatic direction control means for the helicopter;

FIGURE 31 is a top view of the helicopter in use;

FIGURE 34 is a view of the vehicle carrying the telescopic tube and the helicopter;

FIGURE 35 is a top view of the mounting of the conveying tube interconnecting the telescopic tube and the helicopter;

FIGURE 36 is a view of the arrangement of FIGURE 35;

FIGURE 37 is a view of the conveying tubes symmetrically arranged with respect to the telescopic tube;

FIGURE 38 is a section through the helicopter along a line XXXVIII—XXXVIII of FIGURE 39;

FIGURE 39 is a longitudinal section of the arrangement of FIGURE 38 along a line XXXVIX—XXXVIX;

FIGURE 40 is an enlarged longitudinal section of the conveying tube;

FIGURE 41 is a cross-section of the arrangement of FIGURE 40 along a line XXXXI—XXXXI;

FIGURE 42 is an enlarged cross-section of the conveying tube along a line XXXXII—XXXXII of FIGURE 43;

FIGURE 43 is a longitudinal section of the coupling of the conveying tube;

FIGURE 44 is a view of the conveying tubes running from the coupling and connected by a connecting element.

Figure 6:
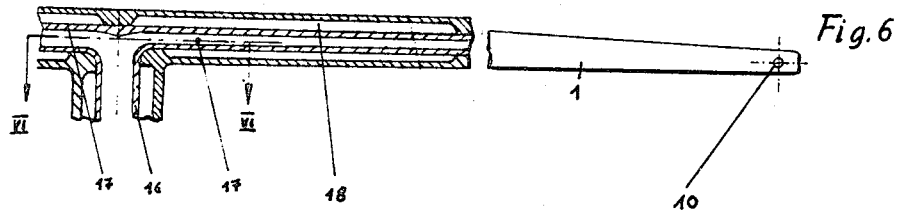
FIGURE 6 is a partial longitudinal section through a helicopter rotor blade having a water jet nozzle at the blade tip.

In the drawing, 1 refers to the rotating airfoil portion, and 2 to the non-rotating support portion, i.e. the part to which the blade 1 are rotatably attached across a head 3. Attached to the portion 2, by means of frames 4 preferably consisting of tubing, are four landing legs 5, developed for example as reservoirs for a ballast fluid. A protective frame 6, having the same diameter of the helicopter rotor and connected to said frame 4, is provided. Connected to said portion 2 is also a hose line 7 which supplies the helicopter from the ground with the materials to be discharged and which at the same time can serve for conveying the energy medium. The equipment for supplying the helicopter is preferably mounted on a vehicle 8 which in addition offers enough space for transporting the helicopter easily to and from the place where it is to be employed.

Figure 4:
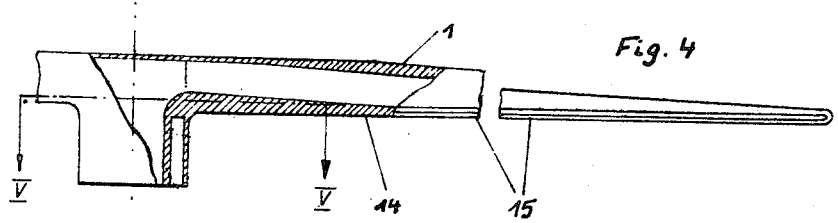
FIGURE 4 is a partial longitudinal section of a helicopter rotor blade having a slot-shaped nozzle.
Figure 5:
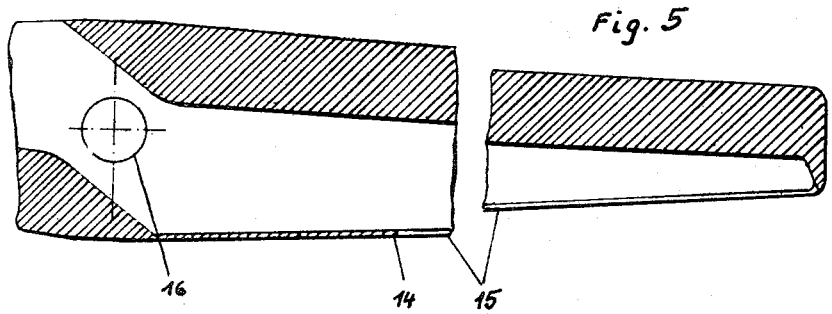
FIGURE 5 is a section along a line V—V through the illustration of FIGURE 4.

Said rotor blades 1 may be hollow and may consist of a sheet-metal skin. If the helicopter is driven by compressed air (FIGURES 2 and 3), nozzles 10 may be provided in the region of the blade tips 9 through which nozzles the compressed air escapes across a supply line 11 and a hub 12, thus producing a reaction drive effect. Connected to said supply line 11 is the hose line 7 leading to the ground. At the hub 12 an annular distributor welt 13 rises which allows the compressed air to flow at a uniform rate to the nozzles 10 of the integral two-blade rotor. In another embodiment (FIGURES 4 and 5) slot-shaped nozzles 15 are arranged on the trailing edge 14; from said nozzles the air streaming through a hollow shaft 16 into the interior of said hollow helicopter rotor blades 1 escapes in the form of a ribbon-shaped jet opposite to the direction of rotation of said blades 1.

Figure 7:
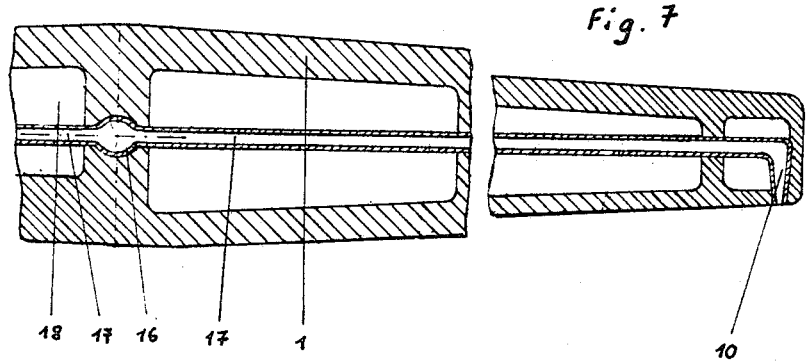
FIGURE 7 is a section through the illustration of FIGURE 6 along a line VII—VII.

If said helicopter blades 1 are to be driven by compressed water said discharge nozzles 10 may be arranged either at the blade tips (FIGURES 6 and 7) or more towards the blade root. From a hollow shaft 16 the water passes across communication lines 17 through spaces 18 in said helicopter rotor blade 1 into said nozzles 10 from which it escapes opposite to the direction of rotation of said blades 1 A. helicopter driven in such a manner may be employed for sprinkling areas of land, etc. The compressed air supplied through said hose line 7 may be used for driving directly said helicopter rotor blades 1 through the nozzle feed line. On the other hand, the compressed air may also indirectly drive said helicopter blades 1 across an air motor 19 and pressure generating means 20 developed, for example, as a double-shot radial blower rotor with a hub 21 and blades 22. The compressed air displacement motor 19 is connected with said non-rotating portion 2 by a bearing 23 while said helicopter rotor blades 1 are supported at 24 as shown in symbolised form.

In a similar manner said pressure generating means may be driven by a device known as a Nernst turbine 25 fed through a hollow shaft 16. The disc-shaped turbine rotor is preferably arranged in the centre of the double-shot radial rotor of the pressure generator 20 and has a larger diameter than that of the radial rotor. The turbine rotates at an extremely high circumferential speed as it is rated for lowest delivery and pressure values.

Figure 10:
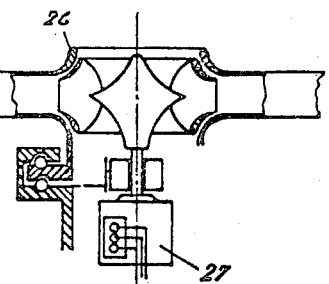
FIGURE 10 is a schematic section of a helicopter rotor hub having pressure-generating means and an electric motor.
Figure 12:
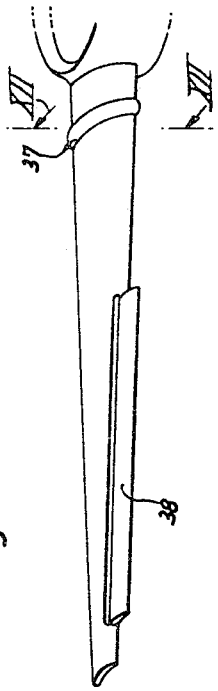
FIGURE 12 is a view of a helicopter rotor blade having jet flap control means.
Figure 23:
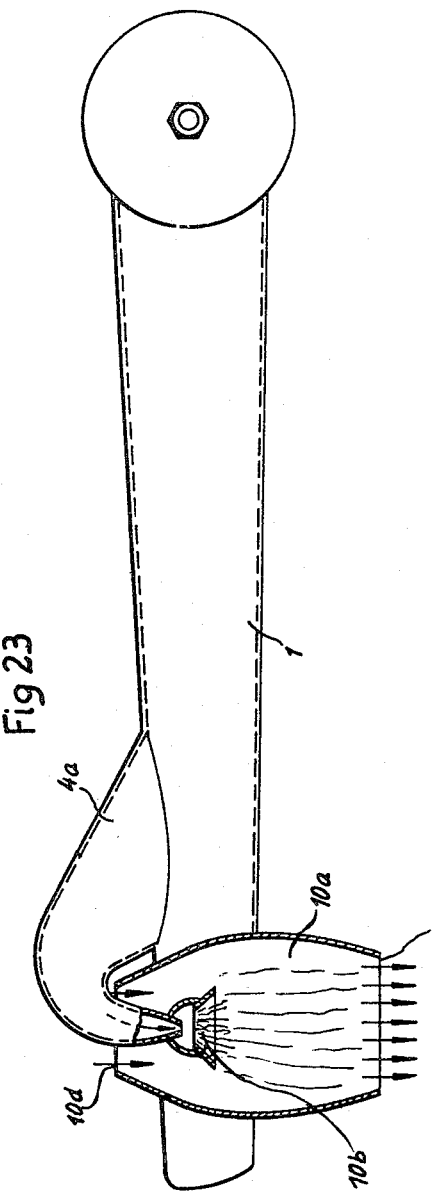
FIGURE 23 is a top view, partially in section, through a helicopter rotor blade having a Lorin tube at the blade tip.
Figure 13:
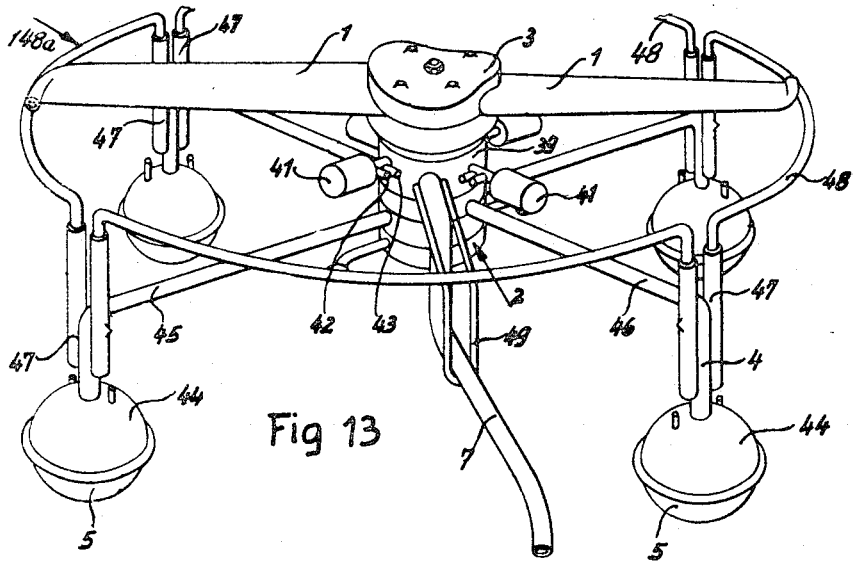
FIGURE 13 is an enlarged view of a helicopter.
Figure 14:
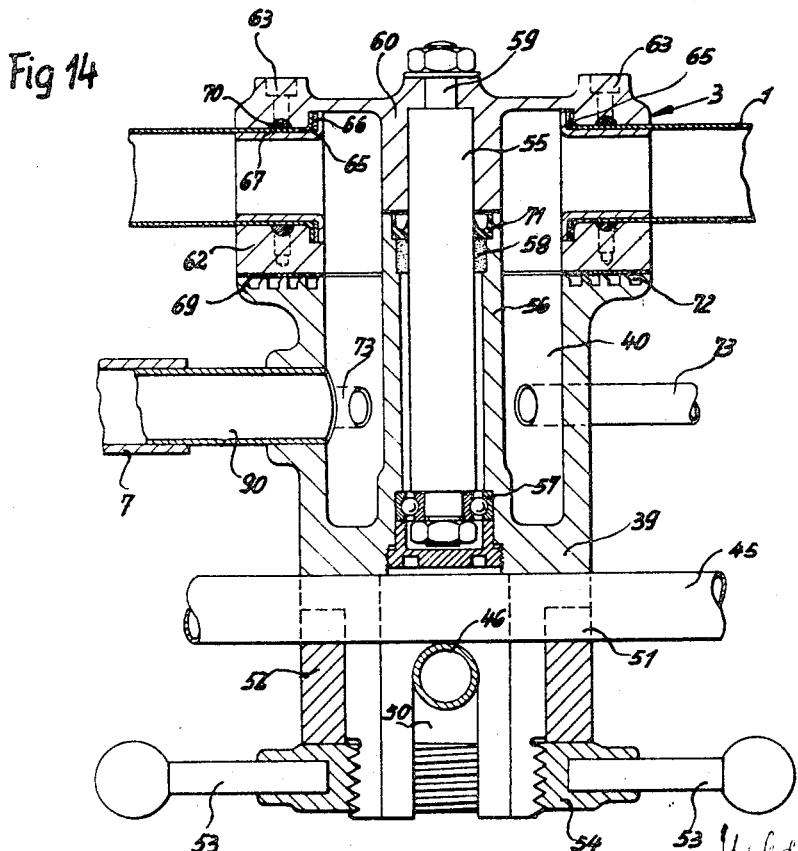
FIGURE 14 is an enlarged section through the non-rotating portion of the helicopter.

The pressure generating means 20 in the hub 26 of said helicopter rotor blades 1 may be driven optionally by an electric motor 27 (FIGURE 10).

In a further embodiment in which water is again used as the driving medium a water turbine 28 is arranged below said pressure-generating means 20 arranged beneath said hub 26. A tube 30 terminating in a turbine housing 29 connects with said hose line 7 leading to the ground which is not illustrated in detail here. The back water of the turbine escapes through a centrally-arranged nozzle 31 while the air forced by the radial rotor into said nozzle 10 of said helicopter blades 1 and then enters through openings 32 and recesses 33 respectively, as indicated by arrows 34 and 35. This drive is especially practical if the helicopter is to be used for fire-extinguishing purposes.

The helicopter blades 1 in the embodiment shown in FIGURE 11 are provided with flapping hinges 36 sealed by sleeves 37. These hinges 36 are required if flying speed is to be increased. In such an instance, so-called jet flaps 38 are provided at trailing blade edge 14, said jet flaps being cyclically rotatable and controllable, for example, by pressure head devices arranged in the blade nose.

In the structural design of the helicopter it must be observed that the individual parts can be readily assembled, as the helicopter should lend itself to transportation to its place of operation by a vehicle, for example. The helicopter, therefore, should not be bulky and should be easily assembled. The parts should not be sensitive to handling, and assembly should be quick so that no extensive operator training is required.

In a very practical embodiment said portion 2 consists of a control housing 39 in the cylindrical annular space 40 of which said hose line 7 carrying the compressed air supplied from the ground by pressure-generating means terminates. Connected to said space 40 are four control valves 41 developed as dual solenoid valves and respectively connected by lines 42 and 43 to the ballast tanks 44 which, at the same time, represent said landing legs 5. The tubes 45 and 46, provided for equalisation of pressure between two opposite ballast tanks 44, may be considered as frames. Said tubes 45 and 46 are bent downwards within the range of the helicopter rotor diameter and carry the ballast tanks 44. Connected to the vertical portion are additional tubes 47 into which sector-shaped members 48 may be inserted to form a protective frame 6. Said hose line 7 coming from the ground is protected against damage at the connection by a guard plate 49.

Arranged in the control housing 39 on one side and on diameters are slots 50, 51 of varying depth and perpendicular to each other, in which the tubes 45 and 46 are inserted, said tubes being retained in said slots by a clamping ring 52 with suitable recesses, and said clamping ring being firmly pressed upon said tubes 45 and 46 by means of a nut 54 provided with levers 53. In the axis of said control housing 39 there is a centering shaft 55 at the other side, said shaft being supported by a ball bearing 57 and a friction bearing 58 in a tubular portion 56. The upper end of said shaft 55 is provided with a bolt 59 so that the top 60 of the head 3 can be screwed to the shaft in a radially-locked manner. The lower part 62 of said head 3 may be pulled from the upper part 60 by means of screws 63. Before bolting the parts together said helicopter rotor blades 1, preferably made from a sheet of metal drawn to shape and welded together merely at its trailing edge 64 and carrying at said blade tips 9 nozzles 10 are clamped. For this purpose said blades 1 are provided with a swaged portion 65 to which a stiffener 66 is attached. For further stiffening a sectional piece 67 is inserted into the blade rotor 68. After inserting said rotor blades 1 into the proper recesses in said upper and lower parts 60, 62 of said head 3, said screws 63 are tightened. Between said head 3 and said rotor blades 1 and said tubular portion 56 of said control housing 39, respectively, and the face of 69 there are gaskets 70, 71, 72, the latter being of the labyrinth type. Tubes 73 lead from said space 40 to the said valves 41.

If the energy medium, such as compressed air, for example, is conveyed together with the material to be discharged through said hose line 7, it will depend on the strength of the material and on the manner of distribution, whether or not they can escape together with the compressed air jet, particularly from said nozzles 10 at said rotor blade tips 9. If the helicopter is used for sowing, for example, the seeds would be damaged by their impact against said blade tip 9. In such an instance the compressed air and the material to be distributed must be separated ahead of the nozzles.

In a further embodiment (FIGURE 19), a dual cyclon 73 having two vessels 74, 75 is arranged on top of the rotor hub to receive through a distributing line 76 the compressed air and the material to be discharged. In said vessels 74, 75 the material separates and drops into a tank 77 from which lines 78 lead to said blade tip 9 parallel to the leading edge of said rotor 1. The speed of flow of the material is determined by the blade tip circumferential speed which controls the rotary pump pressure acting upon said tank 77 as a suction. If the material escapes at too high a speed said lines 78 may alternatively terminate at other portions of the trailing edge of the blade, for example at the blade centres. The compressed air freed from the material is routed from the tops of said vessels 74, 75 also to a tank 79 through lines 80 and 81. Lines 82 branch off from said tank 79, through which the compressed air flows to said nozzles 10.

Installed in said distributing line 76 and in connecting lines 83, 84 are throttles 86, 87, 88, 89 actuated by electro-magnets 85. If the compressed air, together with the material to be discharged, flows from said hose line 7 into said distributing line 76, the throttles are intermittently opened and closed by ground control means in such a maner that in time intervals said throttles 86 and 89 are closed and said throttles 87 and 88 are opened. The material, therefor, first collects in said vessel 75, the clean compressed air flows immediately through said line 81 to said tank 79 and from there to said nozzles 10. In the next time interval the previously opened throttles are closed and vice versa. This means that the material collects in said vessel 74 and the compressed air flows through said line 89 to said tank 79 and further to said nozzles 10. At the same time the material collected in said vessel 75 during the last interval drops into said tank 77 and is sucked outwardly through said lines 78. In this way it is possible to separate without appreciable drag or resistance the compressed air from the material to be discharged.

Figure 20:
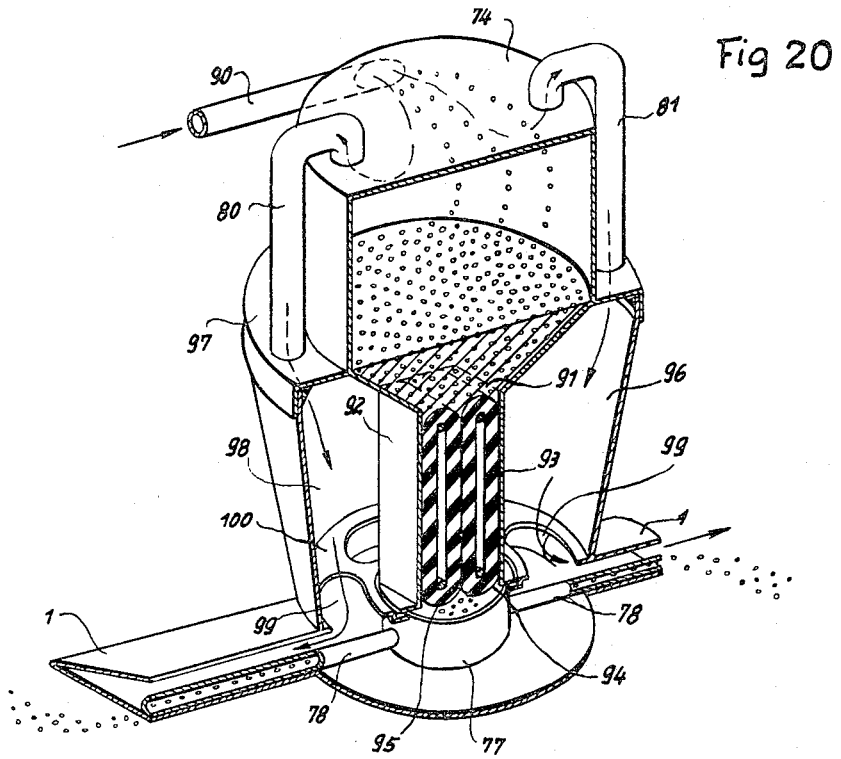
FIGURE 20 is a perspective view, partially in section, of another separator.

In another embodiment (FIGURE 20), one cyclon is required only. The vessel 74 is again arranged above the centre of said rotor blades 1. Both the compressed air and the material are brought from said hose line 7 across a line 90 into said vessel 74 which widens conically at its lower portion and which has a discharge opening 91 of rectangular cross section. Adjacent to said discharge opening 91 is a housing 92 in which a conveyor 93 is accommodated, said conveyor consisting of two running belts 94, 95 clad with a soft, resilient foam-rubber-like material. Both the cone and housing 92 are surrounded by a cylindrical wall 96 in the face 97 of which two said lines 80 and 81 terminate through which the compressed air flows into a space 98 formed by said cylindrical wall 96. Inserted in the lower portion of said space 98 is a stiffener plate 100 provided with openings 99, said stiffener plate also sealing the space for the compressed air against said tank 77 supplied with the material by said conveyor 93. From said tank 77 the material leaves through said lines 78. Due to the specific configuration of the conveyor the material is seized by the belts at said discharge opening 91 and taken along to said tank 77. Nevertheless, said closely-adjoining belts 94, 95 form a tight seal against the compressed air.

In a third embodiment, the axis of the separator again coincides with the axis of said rotor blades 1. This time the separator also developed as a cyclon is arranged beneath said rotor blades 1. The material collecting in said vessel 74 is not outwardly distributed by the rotor blades, but leaves into the atmosphere by way of a helical pump 101 acting as distributing means. The rotors 103 driven by an electric motor 102 may consist, for example, of steel, while a stator 105 arranged in a housing may be made of rubber for example. By using such a material conveying system, effective sealing against the compressed air is likewise assured. The compressed air flows without any other materials admixed from said vessel 74 into said head 3 sealed against said vessel by labyrinth gaskets not shown in detail and from there through the hollow blades to said nozzles 10. The length of the helical pump 101 in horizontal direction is so adjusted that the material escaping at the ends 106 covers the bottom uniformly.

If the helicopter is to be employed, for example, for smoke-treating wineyards or other areas in order to protect them against freezing weather, said rotor blades 1 may optionally be developed as combustion chambers 1a in which the fuel is ignited and burned. The fuel may either be delivered in the same hose line 7 in which also the compressed air is supplied, or it may be delivered by a pump in a separate line leading to the helicopter rotor hub where it is atomised by the compressed air and taken into the combustion chamber. At the same time the combustion chamber may be supplied with water, also in an atomised form. The gas or steam jet escapes at the trailing edge of said blade through slot-shaped nozzles 15a.

Said helicopter rotor blades 1 may also be driven by a Lorin tube 10a. The compressed air/fuel mixture is routed through a pot 4a to an axially arranged burner nozzle 10b. In addition to the compressed air carried, combustion air is taken in through an intake opening 10d opposing the jet escape opening 10c.

The helicopter, preferably having rigid rotor blades 1, can be controlled either by incidence flaps arranged at the trailing side of said helicopter rotor blades 1 or by weight displacement in the non-rotating fuselage 2, as in consideration of the low travelling speed for which the helicopter is rated there are no appreciable moments caused by the absence of flapping or drag hinges. The control signals are transmitted by a special line or by wireless means.

By means of weight displacement, an inclination of the vertical axis and thereby of the rotor plane is obtained which results in certain above-ground speed. As the rotor blade angle of incidence is preferably non-variably preselected the lifting force for given blades is solely dependent on their speed of rotation. Therefore the helicopter will rise at increasing speed of rotation, i.e. when the volume of the air escaping through the nozzles increases, and lower as soon as the speed of rotation is decreased.

Figure 24:
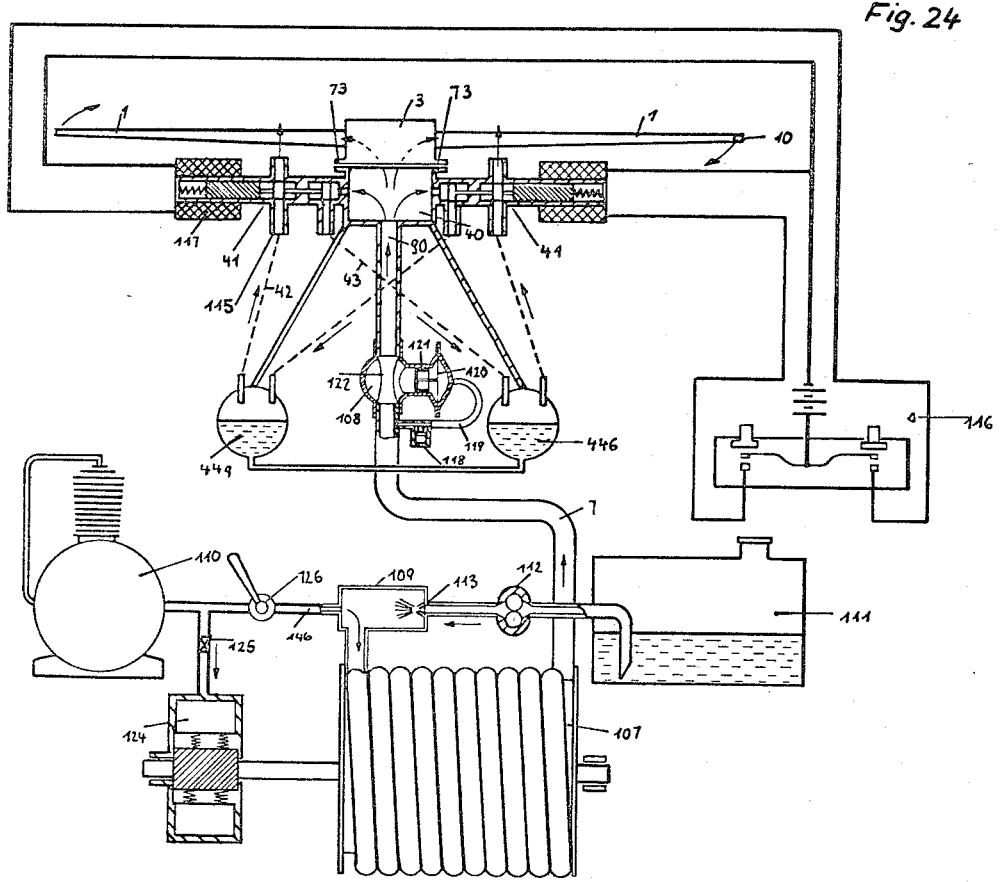
FIGURE 24 is a schematic view of the material supply system.
Figure 26:
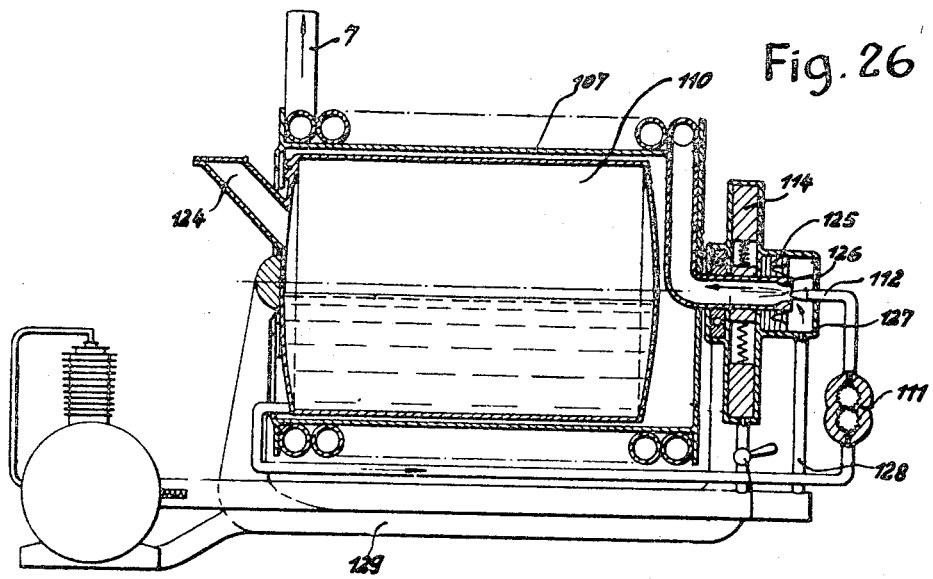
FIGURE 26 is a longitudinal section of the winding drum for the hose line.
Figure 25:
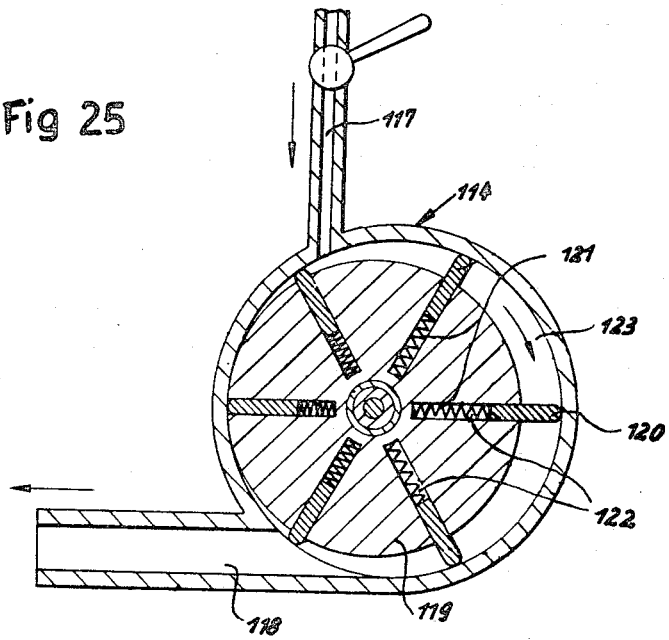
FIGURE 25 is a device developed as a rotary gate motor for winding the drum.
Figure 32:
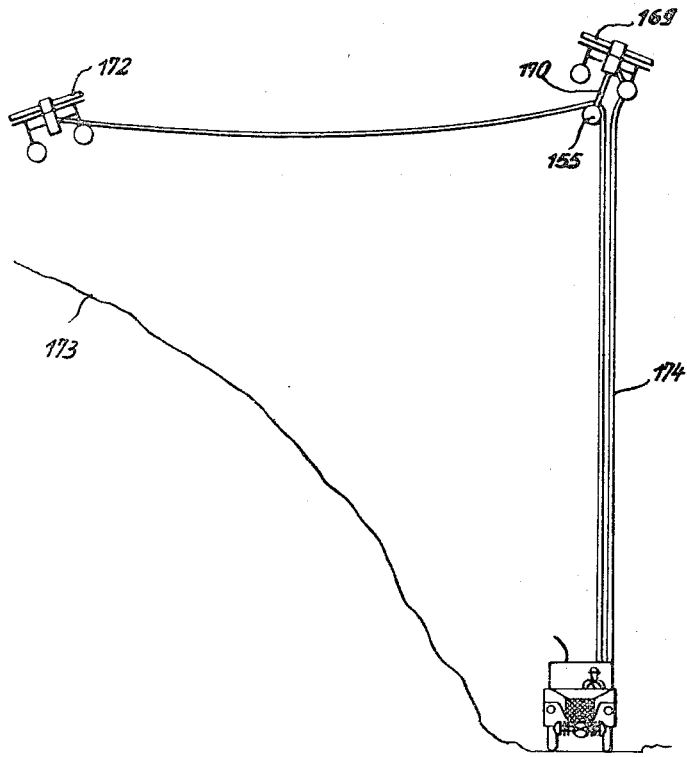
FIGURE 32 is an arrangement of two helicopters supplied by a ground unit.
Figure 33:
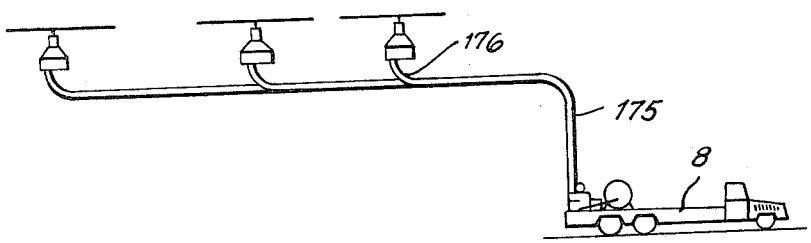
FIGURE 33 is a view of helicopters operating side by side.

An example of a structural design of a ground station is shown in FIGURE 24. Said hose line 7 connecting the helicopter with the ground equipment conveys in this example compressed air and a liquid in atomised form, for example an insecticide. The hose line is wound on a large-diameter drum 107 and variable in its cross-sectional area. On the ground side said line terminates in a mixing chamber 108 into which compressed air generated by pressure-generating means 109 such as a piston or centrifugal type compressor flows on the one hand and into which the liquid to be sprayed is brought in from a storage tank 110 across a pump 111 through an atomiser nozzle 112. The compressed air/atomised liquid mixture flows through said hollow rotor blades 1 to said nozzles 10. Said drum 107 aligned in take-up direction is under constant pre-load. In this way said hose line 7 is always wound up if, for example, the helicopter flies towards the drum and thus releases hose length at the same helicopter flying height. A pre-load can easily be produced by arranging on a shaft 113 a rotary gate or vane motor 114 operated by compressed air from said pressure-generating means 109, said motor corresponding as to its effect to a spring having an infinitely soft characteristic. By installing a throttle valve 115 the amount of pre-load may be selected, and the compressed air can be controlled by means of a throttle valve 116 arranged in the line between said pressure-generating means 109 and said mixing chamber 108.

In FIGURES 25 through 28, further details of the structural elements used in this design are represented. Said rotary gate or vane motor 114 together with a line 117 and an outlet neck 118 incorporates a rotor 119, the eccentricity of which may be optionally varied, in which gates 120 outwardly forced by pressure springs 121 slide in radially arranged slots 122. The compressed air drives the rotor in the direction of the arrow 123, whereby the rotor transmits a certain amount of torque to said drum shaft 113, such torque being variable by either changing the amount of eccentricity or said throttle valve 115.

For space economy, said storage tank 110 may be housed within said drum 107. The material to be discharged, in this case a liquid, is filled in through a neck 124. Said hose line 7 wound on said drum 107 terminates in an axle end 125 of said drum 107. An inlet 126 is surrounded by a housing 127 into which the compressed air coming from said pressure-generating means 109 enters through a line 128. The liquid delivered by said pump 111 from said storage tank 110 is taken along line from an injector at said inlet 126 from said nozzle 112. Said axle end 125 is surrounded by said gate motor 114. Said drum is freely rotatable about said storage tank 110 supported by a bracket 129.

Figure 28:
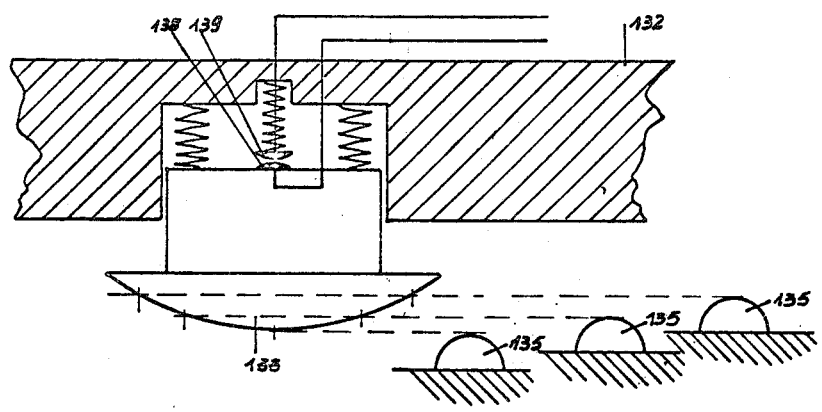
FIGURE 28 is a section of a detail of the ground control device in enlarged representation.

The ground control means are developed as a contact timer unit. It consists of a housing 130 having at its top 131 a circular recess. In that circular recess a control plate 132 is seated at the lower side of which segment-shaped control cams 133 are resiliently supported. Arranged below said control plate 132 is another plate 134 having a contact piece 135, said plate 134 being rotated by an electric motor 136 running at constant speed. Said control plate 132 may be omnilaterally moved about a point 137 by means of a control lever 138. Dependent upon the angle and the direction of inclination, the respective inclination of said plate 132 determines how long the individual control cams 133 are depressed by said constantly rotating contact piece 135. FIGURE 28 shows that depressing time becomes the longer the closer said contact piece 135 is at said control cam 133. Contact time is then transmitted across contacts 138, 139 to said corresponding electro-magnetically operated valve 41. Also to control the helicopter flying height by means of the same control lever 138 the latter may be rotatable. At such rotation a contact ring 140 movable in guides 141 is moved across an eccentric plate 142. Arranged within said contact ring 140 are further control cams 143 determining the time intervals for a butterfly valve or wobble across a contact piece 144. There said contact piece 144 arranged at the periphery of a plate 145 is driven by said electric motor 136 across a wheel 146 and thereby also runs at a constant speed. By this arrangement the helicopter may be controlled with one hand in order to free the other hand for steering the vehicle in motion.

As already shown in FIGURE 1, the ground equipment consisting of said hose drum 107 for said hose line 7, said compressed air-generating means 109 are then jointly driven by the vehicle propulsion engine and are therefore arranged in its proximity. Rotatably mounted on a frame 147 of said vehicle 8 is a telescope-type tube 148 which can be anchored to the ground by a point 149 in vertical position. A collecting line 150 routes the compressed air from said compressed air-generating means through another pipe line 151 to said gate motor 114 and through said line 128 to said housing 127 respectively. 152 is the line coming from the liquid container.

Rotatably supported on the top of the telescope-type tube 148 is a deflector pulley 153 mounted on a frame 154 movable by a pin 155. Attached to said pin 155 is a current-carrying arm 156 producing contact on sector-shaped contact plates 157, 158 depending on the respective position of said deflector pulley 153. Said contact plates 157, 158 rigidly mounted to said telescope tube 148 on a cap 159 are electrically connected to said valves 41 of said two ballast tanks 44 lying on a line perpendicular to said hose line 7. The control signals for automatic flight control are superimposed on the hand control system by means of said ground control means. Said pin 155 is carried in a friction bearing 160 and is preferably supported by a ball 161.

The path of flight 162 of the helicopter selected when operating in large areas with a helicopter 163 and said vehicle 8 depends upon the material to be discharged. The flight path is preferably perpendicular to the driving path 164 in parallel lines along the arrows 165, 166. At each reversing point semi-circular lines 167 are flown, the diameter 168 of which corresponds to the dispersion range of the material to be discharged.

In rough or hilly terrain, one helicopter may be equipped as a suspension helicopter 169 with a deflector pulley 153 mounted on an arm 170. As shown by the broken line 171 said hose line 7 for a working helicopter 172 would be slack and thereby make employment of the helicopter at a slope 173 impossible did it not run over said deflector pulley 153. Said suspension helicopter 169 may be supplied through a separate line 174 from said motor vehicle 8 and equipped with a direction control means in order to fix it in a stationary position, e.g. vertically over the vehicle.

From ground control equipment mounted, for example, on a vehicle 8, several helicopters flying side by side may be supplied. They are preferably connected to a common hose line 7 for delivery of the material to be discharged and the driving medium while the control lines 175 are led to separate ground control equipment. Discharge performance may be considerably increased by arranging a larger number of helicopters supplied by a ground station. In order to shut down one helicopter after the other there are shut-off valves provided at a junction 176 of said hose line 7, said shut-off valves being actuated electro-magnetically in a manner not shown here and closing a branch line leading to the helicopter to be shut down.

In another embodiment the non-rotating support portion 2 is mounted at the top of the telescopic tube 148. The main portion of the hose line 7 conveying drive and the material to be discharged is within the telescopic tube 148.

In FIGURES 35 to 43 a conveying tube 177 is mounted between the coupling portion 178 at the end of the telescopic tube and the helicopter 179, the conveying tube 177 being mounted at the coupling portion 178 by means of a hose 180 leading to a vehicle 8. As disclosed in FIGURE 37 several conveying tubes, e.g. two tubes, can be used, positioned symmetrically to the telescopic tube and the helicopters 179 acting on the end of the conveying tube 177 or preferably on a point between the coupling portion 178 and the end of the conveying tube 177 as shown on the right side of FIGURE 37.

FIGURE 44 discloses several conveying tubes 177, 177' running from the coupling portion 178 and connected by a connecting element 209 the helicopter 179 acting on the latter. The distance between the ends of the conveying tubes 177, 177' and the coupling portion 178 is longer than the distance between the helicopter 179 and the coupling portion 178.

In this embodiment the support portion 2 of the helicopter is a connecting pipe 181 and a bend 182, the bend 182 movably embracing the connecting pipe 181 over a part 183. The connecting pipe 181 carries a shaft 184 interpenetrating the outer wall of the bend 182. A guide bearing 185 pivotally mounted at the shaft 184 is connected to the bend 182. At the bend 182 a pneumatic cylinder 186 is mounted with the piston affecting a lever 187 connected to the shaft 184. Thus the support portion 2 and obviously the plane in which the helicopter blade is rotating are rotatably mounted around the shaft and the connecting pipe 181, whereby the helicopter can withstand and balance air force influencing the conveying tube 177.

A support 188 is perpendicular to the guide bearing 185 resp. the bend 182 and connected thereto, the support 188 carrying a pneumatic cylinder 189. The piston of the pneumatic cylinder is connected to the rod 190 engaging the flaps 191 at the blade tips. The blades 1 are ending in a hub 192 mounted at the end of the bend 182 and being fixed by means of the flange 193, whereas fixing in axial direction is achieved by a collar 194.

FIGURES 38 and 39 disclose a conveying tube 195 extending along the top periphery of the conveying tube 177. A spiral conveyor 196 ending at the support 188 is rotating within the conveying tube 195. A conveyer unit 197 provides distribution in a direction perpendicular to the tubes 198 and discharge at the blade tips.

The conveying tube 177 is required to have minimum weight. However, in order to withstand gravity and air forces it must be comparatively stiff and is preferably formed by a thin shell made, for example, from plastic material. Stiffness of the shell is maintained by constant inside overpressure. Overpressure can be obtained by the compressed air inducing drive and rotation of the helicopter blades.

In a preferred embodiment of the invention the conveying tube 177 is assembled from components made in mass production and ends in flanges 199 having inside sealing rings. The flanges are clamped by retaining rings 201. The conveying tube 195 having a spiral conveyer 196 is of the same type, the individual spiral conveyers being coupled by means of jaw clutches 202 resp. a similar connection.

Though being as light as possible the conveying tube 177 must be considerably stiff in order to withstand deflection and driving off. For this reason the tube is a double wall tube with the inner wall 203 eccentric to the outer wall both walls being in contact at a bottom point. In the embodiments of FIGURES 40 to 43 the conveying tube 195 extends at this point. Plastic material is filled into the space 205 between the walls 203 and 204.

When discharged through the blades 1 according to the projection parabola 206 heavier particles are discharged to more remote places, whereas according to the projection parabola 207 lighter particles fall down near the helicopter. Even spraying of the material to be discharged can be achieved by appropriate weight-distribution balance. The material to be distributed can also be discharged through the holes 208 extending along the conveying tube 177 and the conveying tube 195. The material to be distributed is discharged evenly through the holes 208 the cross-section of which can be changed, if necessary.

It is an object of the invention that the material to be discharged, e.g. pest control substances, is also sprayed to the underside of the leaves. The arm carrying the conveying tube or the conveying tube itself are insulated against the ground, e.g. against the vehicle carrying the telescopic tube and are high-voltage charged (20,000 v. for example). Thus due to the electrostatic field of the plants the charged particles of the material to be discharged arrive at the underside of the leaves which is a very effective way of spraying as most of the parasites are there.

I claim:

1. An apparatus for the distribution of material in particulated, liquid or gaseous form from points above the ground comprising, in combination, a driven vehicle; a helicopter-type aircraft means having a non-rotating support portion and a rotary rotor portion journaled in said support portion for generating lift and forward motion of said aircraft; elongated conduit means between said vehicle and said aircraft; distributing means cooperating with at least one of said first mentioned two means for distributing the material; energy producing means carried by said vehicle and connected to said conduit means for supplying said aircraft means with energy to drive said rotor portion; material supply means carried by said vehicle and connected to said elongated conduit means for supplying said distributing means with material to be distributed; and support means engaging a portion of said elongated conduit means between said vehicle and said aircraft means during flight of the latter for supporting said portion a considerable distance above the vehicle and laterally of said aircraft means to prevent rotation of said support portion and engagement of said elongated conduit means with objects projecting upwardly from the ground.

2. An apparatus as claimed in claim 1, wherein drive of the rotor portion is produced by jet reaction.

3. An apparatus as claimed in claim 2, wherein said rotor portion is driven by means of compressed air delivered to said aircraft via said conduit means and wherein said energy producing means comprises compressor means.

4. An apparatus as claimed in claim 3 wherein said material supply means comprises means for admixing with said compressed air finely divided particles of said material for conveyance by said compressed air to said aircraft through said conduit means.

5. An apparatus as claimed in claim 1, wherein said rotor portion is provided with a plurality of rearwardly directed nozzles communicating with said conduit means for dispersing said material and driving said rotor portion by the reaction discharge of said compressed air.

6. An apparatus as claimed in claim 1, further comprising fluid-operated motor means on said aircraft coupled with said rotor portion and supplied by said conduit means for energization by a pressure fluid forced through said conduit means.

7. An apparatus as claimed in claim 6, wherein said motor is a compressed-air-generating turbine, said rotor portion having a plurality of rearwardly directed nozzles, said turbine feeding said nozzles for rotating said rotor portion by the reaction discharge of compressed air.

8. An apparatus as claimed in claim 7, wherein said energy supply means comprises compressor means for generating compressed air and forcing it through said conduit means, said turbine being rotated by the compressed air.

9. An apparatus as claimed in claim 8, wherein said compressed-air-generating turbine is coupled with a Nernst type turbine in said support portion and driven by compressed air.

10. An apparatus as claimed in claim 6, wherein said motor is operable by a liquid supplied through said conduit means, said motor having a discharge end for spent liquid, said support portion being provided with nozzle means connected to said discharge end and for discharging spent liquid from said aircraft.

11. An apparatus as claimed in claim 1, wherein said rotor portion is formed with at least one combustion chamber and a plurality of rearwardly directed discharge nozzles for the release of combustion products, wherein said energy supply means comprises means for feeding compressed air and fuel to said combustion chamber and means in said aircraft for igniting said fuel in said combustion chamber, thereby driving said rotor portion by the reaction energy of the discharged combustion products.

12. An apparatus as claimed in claim 11, wherein said material supply means comprises means for entraining along with the compressed air fed to said combustion chamber the material to be discharged.

13. An apparatus as claimed in claim 11, wherein said aircraft is provided with at least one atomizing nozzle in the region of said rotor portion, said conduit means including a duct for feeding said fuel to said atomizing nozzle, and pump means at said vehicle for forcing said fuel through said duct.

14. An apparatus as claimed in claim 13, wherein said combustion chamber constitutes part of a pair of angularly spaced ram-jet engines mounted upon said rotor portion for rotating said rotor portion relatively to said support portion.

15. An apparatus as claimed in claim 1, wherein said support portion comprises a plurality of spaced ballast containers, tubular members interconnecting at least juxtaposed ones of said containers, and a plurality of segmental protective frames centered on the axis of said rotor portion and having approximately the diameter thereof.

16. An apparatus as claimed in claim 15, wherein said support portion is formed with a central control-system housing secured to said tubular members, further comprising a rotor shaft journaled in said housing and provided with a split hub receiving a plurality of lift-generating rotor blades between its parts, said blades constituting said rotor portion.

17. An apparatus as claimed in claim 16, wherein said blades are formed at their root portion with reinforcing profiles engageable by said hub and said hub having an upper portion adapted to be clamped against the profiled parts of said blades, further comprising a sealing ring interposed between said upper portion of said hub and a lower portion thereof.

18. An apparatus as claimed in claim 16, wherein said housing is provided with cruciform slots of different depths into which said tubular members are insertable, and clamping means for securing said tubular members in said slots.

19. An apparatus as claimed in claim 4, wherein said material is entrained together with said compressed air through said conduit means, said aircraft being provided with separating means for separating said material from said compressed air.

20. An apparatus as claimed in claim 19, wherein said separating means comprises a funnel-shaped cyclone chamber having a vertical axis and first outlet means for said compressed air at an upper end of said chamber and second outlet means for said material at the lower end of said chamber.

21. An apparatus as claimed in claim 20, further comprising conveyer means at said lower end for transporting said material to said rotor portion for broadest distribution thereby.

22. An apparatus as claimed in claim 21, wherein said conveyer means includes a pair of endless conveyer belts operating in opposite directions and provided with a permeable flexible belt for feeding said material to said rotor portion.

23. An apparatus as claimed in claim 21, wherein said conveyer means includes a worm-type pump having a housing portion consisting of flexible material and a worm portion hugged thereby, whereby pressure equalization between axial locations along said worm portion is prevented.

24. An apparatus as claimed in claim 20, wherein said cyclone chamber is subdivided into a pair of compartments each sustaining an independent whirl of fluid, further comprising control means for selectively connecting these compartments with said first and second outlet means.

25. An apparatus as claimed in claim 1, wherein said rotor portion comprises a plurality of blades radially extending from a hub portion thereof, each of said blades being provided with slot-shaped discharge nozzles along their trailing edges intermediate said hub portion and the outermost ends of the blades for the discharge of material of high specific gravity.

26. An apparatus as claimed in claim 1, further comprising flight-control surfaces downstream of said rotor portion and mounted upon said support portion, said control means being connected with said surfaces for varying the pitch thereof.

27. An apparatus as claimed in claim 1, wherein said material supply means consists of a hose drum of large diameter, a pressure source, for example a compressed air generator, a storage tank for the materials to be discharged, a metering device, and a ground control station.

28. An apparatus as claimed in claim 27, comprising a mixing chamber into which, on the one hand, compressed air is supplied from the compressed air generator and, on the other hand, the material to be discharged from the helicopter is supplied via a pump from the storage tank so arranged that the discharge from the mixing chamber is connected to the beginning of the hose pipeline wound on the drum.

29. An apparatus as claimed in claim 27, wherein the hose drum surrounds the storage tank.

30. An apparatus as claimed in claim 29, wherein rollers are attached to the storage tank on which the surrounding hose drum is rotatably supported and the hose pipeline terminates in an axial socket which blends into the mixing chamber.

31. An apparatus as claimed in claim 30, wherein a vane motor supplied with part of the flow of compressed air from the compressed air generator is arranged on the drum shaft for the purpose of generating the winding-up force.

32. An apparatus as claimed in claim 1, wherein said support means comprises a telescopically extensible tube mounted upon said vehicle in an upright position and supporting said conduit means at the upper end of said tube.

33. An apparatus as claimed in claim 32, wherein said tube is rotatably mounted on said vehicle and is detachable therefrom, further comprising anchor means for connecting it with the ground.

34. An apparatus as claimed in claim 32, wherein said tube is provided at its upper end with a swingable outrigger for controlling the direction of flight of said aircraft.

35. An apparatus as claimed in claim 1, wherein said support means comprises a suspension aircraft connected with said vehicle for supporting said conduit means intermediate the helicopter type aircraft and said vehicle.

36. An apparatus as claimed in claim 1 wherein a plurality of such aircraft is provided in chain formation, said conduit means including a respective pipeline individual to each of said aircraft for powering it independently of the others.

37. An apparatus as claimed in claim 36, wherein said individual pipelines each branch off a main pipeline connected with said vehicle further comprising electromagnetic control means along said main pipeline and operable from said vehicle for regulating flow to each of said individual pipelines.

38. An apparatus as claimed in claim 32, wherein the material to be discharged being conveyed to the rotor portion via a hose line inside the telescopic tube.

39. An apparatus as claimed in claim 32, wherein a coupling portion receiving a conveying tube assembled from components is mounted at the top of the telescopic tube, and the conveying tube is connected at one end to a container on the vehicle via a hose line forming part of said conduit means and at the other end to said helicopter.

40. An apparatus as claimed in claim 39, wherein the telescopic tube is connected to a double coupling portion and two conveying tubes via hose lines, every conveying tube being connected to a helicopter.

41. An apparatus as claimed in claim 39, wherein the conveying tube is a double wall tube with the inner wall eccentric to the outer wall, the walls thus being in contact at the underside of the tube and plastic material being filled into the space between the two walls.

42. An apparatus as claimed in claim 39, comprising a conveying tube having an inside conveying tube, the latter being mounted at the bottom and a spiral conveyor in the inside conveying tube.

43. An apparatus as claimed in claim 42, wherein the spiral conveyor is subdivided equally to the conveying tube and the individual spirals are connected by means of jaw clutches and the tube sections are ending in flanges with inside sealing rings and a retaining ring of special type embracing the conical surfaces of the flanges.

44. An apparatus as claimed in claim 42, wherein even discharge of the material to be distributed is achieved by holes extending over the whole length of the conveying tube.

45. An apparatus as claimed in claim 39, wherein the support portion is a connecting pipe and a bend, the bend movably embracing the connecting pipe and the hub of the rotor portion is mounted at the free end of the bend.

46. An apparatus as claimed in claim 45, comprising a support with radial ribs at one end of the bend, a shaft extending from the support and interpenetrating the wall of the bend and a guide bearing mounted at the bend, the shaft and the guide bearing being coupled via a pneumatic cylinder.

47. An apparatus as claimed in claim 46, comprising a top conveying tube, pivotable flaps near the blade tips and a support inside the bend and connected thereto and another pneumatic cylinder for control of a lever system, the lever system controlling the flaps and another conveyor system surrounding the support, the conveyor system conveying the material to be discharged from the end of the spiral conveyor to the conveying tubes leading to the blades of said rotor portion.

References Cited

UNITED STATES PATENTS

| | | | |
|---|---|---|---|
| 1,523,926 | 1/1925 | Ypma | 244—17.17 |
| 1,606,208 | 11/1926 | Conlin | 239—188 |
| 2,634,165 | 4/1953 | Murphy | 239—188 |
| 2,948,489 | 8/1960 | Miller | 244—17.17 |
| 2,954,932 | 10/1960 | Albano | 239—188 |
| 2,995,864 | 8/1961 | Werelius | 239—188 X |
| 3,117,749 | 1/1964 | Angel | 244—17.17 |

FOREIGN PATENTS 616,997  1/1949  Great Britain.

FERGUS S. MIDDLETON, *Primary Examiner.*

MILTON BUCHLER, *Examiner.*

B. BELKIN, *Assistant Examiner.*